(12) United States Patent
Matsushima

(10) Patent No.: US 12,099,766 B2
(45) Date of Patent: Sep. 24, 2024

(54) INFORMATION PROCESSING SYSTEM, INFORMATION PROCESSING METHOD, AND RECORDING MEDIUM

(71) Applicant: Ricoh Company, Ltd., Tokyo (JP)

(72) Inventor: Hiroyuki Matsushima, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 18/132,452

(22) Filed: Apr. 10, 2023

(65) Prior Publication Data
US 2023/0259316 A1 Aug. 17, 2023

Related U.S. Application Data

(63) Continuation of application No. 17/585,568, filed on Jan. 27, 2022, now Pat. No. 11,662,968.

(30) Foreign Application Priority Data

Jan. 28, 2021 (JP) ................................ 2021-012260

(51) Int. Cl.
G06F 3/12 (2006.01)
(52) U.S. Cl.
CPC .......... G06F 3/1272 (2013.01); G06F 3/1204 (2013.01); G06F 3/1267 (2013.01)
(58) Field of Classification Search
None
See application file for complete search history.

(56) References Cited

U.S. PATENT DOCUMENTS

| 2010/0220348 | A1  | 9/2010 | Matsushima |
| 2013/0194633 | A1* | 8/2013 | Takatsu ................. G06F 3/1288 358/1.15 |
| 2014/0020117 | A1  | 1/2014 | Nagai et al. |
| 2014/0223570 | A1  | 8/2014 | Matsushima et al. |
| 2014/0289817 | A1  | 9/2014 | Matsushima |
| 2015/0169849 | A1  | 6/2015 | Takemoto et al. |

(Continued)

FOREIGN PATENT DOCUMENTS

| JP | 2005-085104 | 3/2005 |
| JP | 2010-287096 | 12/2010 |

(Continued)

OTHER PUBLICATIONS

"Platform and app integration", Web site <https://www.peecho.com/platform-and-app-integration/>, retrieved from Internet Archive <https://web.archive.org/web/20210126110233/https://www.peecho.com/platform-and-app-integration/> on Jan. 26, 2021.

Primary Examiner — Frantz Bataille
(74) Attorney, Agent, or Firm — XSENSUS LLP

(57) ABSTRACT

An information processing system includes processing circuitry. The processing circuitry is configured to: accept a job requesting print output of print data from an information terminal; determine one or more printing companies having a printing machine that can execute a job, among a plurality of printing companies, based on a state of a printing machine held by each one of the plurality of printing companies and a content of the job; and transmit information of the one or more printing companies determined, to the information terminal to display the information on the information terminal.

26 Claims, 18 Drawing Sheets

(56) References Cited

U.S. PATENT DOCUMENTS

| | | |
|---|---|---|
| 2016/0006796 A1 | 1/2016 | Matsushima et al. |
| 2016/0125174 A1 | 5/2016 | Matsushima |
| 2016/0173709 A1 | 6/2016 | Kouno |
| 2017/0070642 A1* | 3/2017 | Miyamoto ............ G06F 3/1226 |
| 2017/0251122 A1 | 8/2017 | Matsushima et al. |
| 2019/0303544 A1 | 10/2019 | Matsushima |
| 2020/0044908 A1 | 2/2020 | Matsushima |
| 2020/0285424 A1 | 9/2020 | Matsuzaka |

FOREIGN PATENT DOCUMENTS

| | | |
|---|---|---|
| JP | 2015-184931 | 10/2015 |
| JP | 2017-167777 | 9/2017 |

* cited by examiner

FIG. 6

```
POST/jobs HTTP/1.1
Host:www.example.com
X-Application-ID:XXXX-XXXX-XXXX
X-Application-Key:XXXX-XXXX-XXXX
Content-Type:application/json {
 "productTypeId":"book-hardcover",
 "printQuality":"normal",
 "desiredDeliveryDate":"2020-01-31",
 "dataSource":"https://www.example.com/images/xxxx-xxxx-xxxx.pdf",
 "customer":{
  "name":"Taro Ricoh",
  "address":"AAA, Ebina, Kanagawa",
  "country":"Japan",
  "email":"TaroRicoh@ricoh.example.com"
 }
 "numberOfCopies":1
}
```

FIG. 7

```
HTTP/1.1 201 Created
Location:https://www.example.com/jobs/xxxx-xxxx-xxxx
Content-Type:application/json {
 "jobId":"xxxx-xxxx-xxxx",
 "productTypeId":"book-hardcover",
 "printQuality":"normal",
 "desiredDeliveryDate":"2020-01-31",
 "dataSource":"https://www.example.com/images/xxxx-xxxx-xxxx.pdf",
 "customer":{
  "name":"Taro Ricoh",
  "address":"AAA, Ebina, Kanagawa",
  "country":"Japan",
  "email":"TaroRicoh@ricoh.example.com"
 }
 "numberOfCopies":1,
 "expectedDeliveryDate":"2020-01-30",
 "price":4000,
 "currency":"JPY",
 "status":"registered"
}
```

FIG. 8

```
HTTP/1.1 201 Created
Location:https://www.example.com/jobs/xxxx-xxxx-xxxx
Content-Type:application/json {
 "jobId":"xxxx-xxxx-xxxx",
 "productTypeId":"book-hardcover",
 "printQuality":"normal",
 "desiredDeliveryDate":"2020-01-31",
 "dataSource":"https://www.example.com/images/xxxx-xxxx-xxxx.pdf",
 "customer":{
  "name":"Taro Ricoh",
  "address":"AAA, Ebina, Kanagawa",
  "country":"Japan",
  "email":"TaroRicoh@ricoh.example.com"
 }
 "numberOfCopies":1,
 "shopCandidates":[
  {
   "shopId":"xxxx-xxxx",
   "shopName":"XXX PRINTING",
   "expectedDeliveryDate":"2020-01-30",
   "price":4000,
   "currency":"JPY",
   "evaluation":80
  },
  {
   "shopId":"yyyy-yyyy",
   "shopName":"YYY PRINTING",
   "expectedDeliveryDate":"2020-01-31",
   "price":3800,
   "currency":"JPY",
   "evaluation":65
  }
 ]
}
```

FIG. 9

```
PUT/jobs/xxxx-xxxx-xxxx HTTP/1.1
Host:www.example.com
X-Application-ID:XXXX-XXXX-XXXX
X-Application-Key:XXXX-XXXX-XXXX
Content-Type:application/json {
  "jobId":"xxxx-xxxx-xxxx",
  "status":"ordered"
}
```

FIG. 10

```
HTTP/1.1 200 OK
Content-Type:application/json

{
  "jobId":"xxxx-xxxx-xxxx",
  "productTypeId":"book-hardcover",
  "printQuality":"normal",
  "desiredDeliveryDate":"2020-01-31",
  "dataSource":"https://www.example.com/images/xxxx-xxxx-xxxx.pdf",
  "customer":{
    "name":"Taro Ricoh",
    "address":"AAA, Ebina, Kanagawa",
    "country":"Japan",
    "email":"TaroRicoh@ricoh.example.com"
  }
  "numberOfCopies":1,
  "expectedDeliveryDate":"2020-01-30",
  "price":4000,
  "currency":"JPY",
  "status":"ordered"
}
```

FIG. 11

```
PUT/jobs/xxxx-xxxx-xxxx HTTP/1.1
Host:www.example.com
X-Application-ID:XXXX-XXXX-XXXX
X-Application-Key:XXXX-XXXX-XXXX
Content-Type:application/json {
 "jobId":"xxxx-xxxx-xxxx",
 "shopId":"yyyy-yyyy"
}
```

FIG. 12

```
HTTP/1.1 200 OK
Content-Type:application/json

{
 "jobId":"xxxx-xxxx-xxxx",
 "productTypeId":"book-hardcover",
 "printQuality":"normal",
 "desiredDeliveryDate":"2020-01-31",
 "dataSource":"https://www.example.com/images/xxxx-xxxx-xxxx.pdf",
 "customer":{
   "name":"Taro Ricoh",
   "address":"AAA, Ebina, Kanagawa",
   "country":"Japan",
   "email":"TaroRicoh@ricoh.example.com"
 }
 "numberOfCopies":1,
 "shopId":"yyyy-yyyy",
 "shopName":"YYY PRINTING",
 "expectedDeliveryDate":"2020-01-31",
 "price":3800,
 "currency":"JPY",
 "status":"ordered"
}
```

FIG. 13

```
GET/jobs/xxxx-xxxx-xxxx HTTP/1.1
Host:www.example.com
X-Application-ID:XXXX-XXXX-XXXX
X-Application-Key:XXXX-XXXX-XXXX
```

FIG. 14

```
HTTP/1.1 200 OK
Content-Type:application/json

{
"jobId":"xxxx-xxxx-xxxx",
"productTypeId":"book-hardcover",
"printQuality":"normal",
"desiredDeliveryDate":"2020-01-31",
"dataSource":"https://www.example.com/images/xxxx-xxxx-xxxx.pdf",
"customer":{
 "name":"Taro Ricoh",
 "address":"AAA, Ebina, Kanagawa",
 "country":"Japan",
 "email":"TaroRicoh@ricoh.example.com"
}
"numberOfCopies":1,
"expectedDeliveryDate":"2020-01-30",
"price":4000,
"currency":"JPY",
"status":"printing",
"deteil":"preparing to print"
}
```

PREPARATION TIME = $T_{pc} + T_{if} + T_{hc} + T_{ac} + T_{tp}$

EXECUTION TIME = $T_{pc} + T_{if} + T_{hc} + T_{ac} + T_{pp}$

INFORMATION PROCESSING SYSTEM, INFORMATION PROCESSING METHOD, AND RECORDING MEDIUM

CROSS-REFERENCE TO RELATED APPLICATIONS

This patent application is a continuation of U.S. application Ser. No. 17/585,568, filed Jan. 27, 2022, which is based on and claims priority pursuant to 35 U.S.C. § 119(a) to Japanese Patent Application No. 2021-012260, filed on Jan. 28, 2021, in the Japan Patent Office, the entire disclosure of each are incorporated by reference herein.

BACKGROUND

Technical Field

Embodiments of the present disclosure relate to an information processing system, an information processing method, and a recording medium.

Related Art

Among digital commercial printing apparatuses, a large-sized high-speed continuous-form printing machine or the like using a roll sheet of paper needs a long time to prepare for printing such as sheet replacement requiring a crane operation, reconnection of peripheral devices, preprocessing for each sheet, and setting of image quality. Also in the printing industry, there is a demand for multi-product small-volume production to meet various needs, and there is a demand for improving the productivity of printing by shortening the preparation time. In addition, the printing company needs to efficiently receive an order for a matter having high profitability in consideration of a machine held by the printing company, a cost required for preparation, and the like, and there are many cases in which the printing company falls into a situation in which an appropriate matter is not found and the machine is made idle.

In such a situation, in order to improve the profit of the printing company by increasing the operation rate of the machine, a mechanism is desired that can supply a stable number of orders without a sales cost (automatic order reception) and without an editing cost before printing (in other words, in a directly printable manner). On the other hand, there is a demand for application vendors who develop services on the Internet to use printing functions as a selling point to increase the number of users and increase profits in printing. Therefore, if an ecosystem that connects an application vendor and a printing company can be constructed, both problems can be solved.

As a technology for providing a printing function to such an application vendor, for example, there is a technology for providing a printing function using an application programming interface (API).

SUMMARY

According to an embodiment of the present disclosure, there is provided an information processing system that includes processing circuitry. The processing circuitry is configured to: accept a job requesting print output of print data from an information terminal; determine one or more printing companies having a printing machine that can execute a job, among a plurality of printing companies, based on a state of a printing machine held by each one of the plurality of printing companies and a content of the job; and transmit information of the one or more printing companies determined, to the information terminal to display the information on the information terminal.

According to another embodiment of the present disclosure, there is provided an information processing method that includes: receiving a job requesting print output of print data from an information terminal; determining one or more printing companies having a printing machine that can execute a job, among a plurality of printing companies, based on a state of a printing machine held by each one of the plurality of printing companies and a content of the job; and transmitting information of the one or more printing companies determined by the determining, to the information terminal, to display the information on the information terminal.

According to still another embodiment of the present disclosure, there is provided a non-transitory computer-readable storage medium having instructions stored thereon, which when executed by one or more processors, cause the one or more processors to execute: receiving a job requesting print output of print data from an information terminal; determining one or more printing companies having a printing machine that can execute a job, among a plurality of printing companies, based on a state of a printing machine held by each one of the plurality of printing companies and a content of the job; and transmitting information of the one or more printing companies determined by the determining, to the information terminal, to display the information on the information terminal.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 6 is a diagram illustrating an example of a job information registration API;

FIG. 7 is a diagram illustrating an example of a response of the job information registration API;

FIG. 8 is a diagram illustrating an example of another response of the job information registration API;

FIG. 9 is a diagram illustrating an example of a confirmation notification API;

FIG. 10 is a diagram illustrating an example of a response of the confirmation notification API;

FIG. 11 is a diagram illustrating an example of another confirmation notification API;

FIG. 12 is a diagram illustrating an example of a response of the confirmation notification API of FIG. 11;

FIG. 13 is a diagram illustrating an example of a job state notification API;

FIG. 14 is a diagram illustrating an example of a response of the job state notification API;

Figure 1:
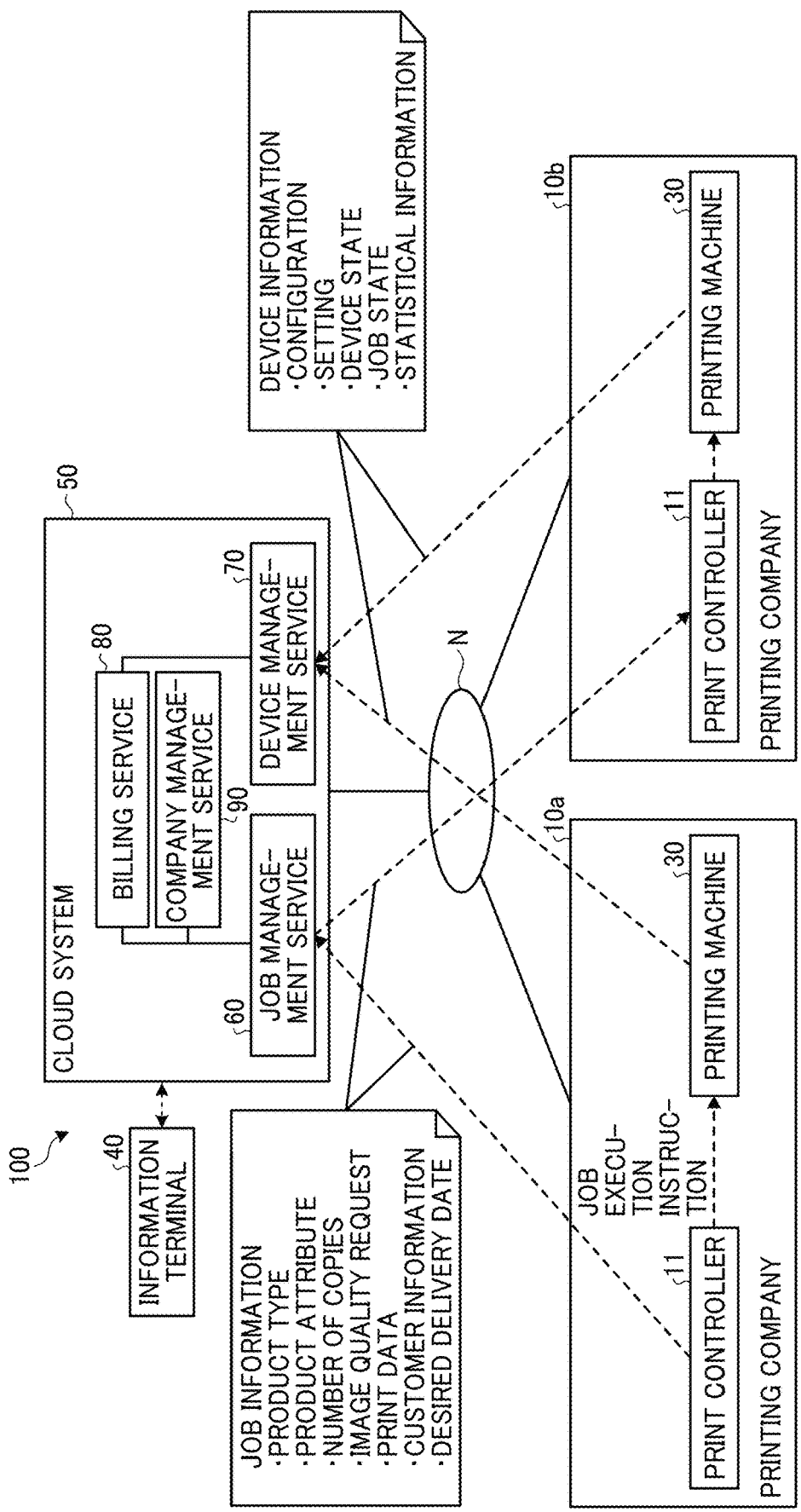
FIG. 1 is a diagram illustrating a schematic configuration of a device system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, an information processing system, an information processing method, and a non-transitory recording medium storing an information processing program according to embodiments of the present disclosure are described with reference to the accompanying drawings. The present invention is not limited by the following embodiments, and the constituent elements in the following embodiments include those which can be easily conceived by those skilled in the art, substantially the same one, and so-called equivalent ranges. Various omissions, substitutions, changes, and combinations of constituent elements can be made without departing from the gist of the following embodiments.

Schematic Configuration of Device System

FIG. 1 is a diagram illustrating a schematic configuration of a device system according to an embodiment of the present disclosure. A schematic configuration of a device system 100 is described below with reference to FIG. 1.

As illustrated in FIG. 1, the device system 100 includes a cloud system 50, an information terminal 40, a print controller 11 and a printing machine 30 of a printing company 10a, and a print controller 11 and a printing machine 30 of a printing company 10b. The cloud system 50, the print controller 11 of each printing company, and the printing machine 30 can perform data communication with each other via a network N. Although the information terminal 40 is illustrated as directly communicating with the cloud system 50 for convenience in FIG. 1, the information terminal 40 may communicate with the cloud system 50 via the network N.

The printing companies 10a and 10b are simply referred to as "printing company 10" when any printing company is indicated or collectively referred to. In the example illustrated in FIG. 1, only two printing companies 10 (printing companies 10a and 10b) are illustrated, but embodiments of the present disclosure are not limited to this. In other embodiments, three or more printing companies 10 may be present in a device system.

Since the cloud system 50 is used in the present embodiment, the network N is a network including the Internet. In the printing company 10, for example, a local area network (LAN) or a wide area network (WAN) is used. A virtual private network (VPN) may be used as the network N.

The printing company 10 means a company having facilities for printing such as a printing factory, a printing place, or a predetermined building. The system of each printing company 10 includes a print controller 11 and a printing machine 30. The print controller 11 and the printing machine 30 may be capable of data communication with each other via a network in the system of the printing company 10.

The print controller 11 is an information processing apparatus such as a personal computer (PC) or a workstation that instructs the printing machine 30 to execute a job when job information is distributed from the cloud system 50.

The print controller 11 may be integrated with the printing machine 30.

The above-described job refers to a unit of print processing. The job is, for example, printing a certain number of sheets of a certain document. In the present embodiment, the printing by the printing machine 30 is the execution of the job. However, what kind of processing the execution of the job is specifically depends on the type of the printing machine 30. Further, as the output obtained by the execution of the job, the result may be simply displayed, stored in the cloud, transmitted by mail, or notified to the user. Alternatively, the job information is information related to a job, but in the present embodiment, a job and job information are not strictly distinguished from each other. The job schedule information indicates a start time and an end time at which a job is scheduled to be executed in a certain printing machine 30.

The printing machine 30 is an image forming apparatus such as a production printer, a color inkjet printer, or a color or monochrome multifunction peripheral (MFP). The printing method of the printing machine 30 is, for example, an electrophotographic method, an inkjet method, relief printing, intaglio printing, planographic printing, or stencil printing, and is not limited to those methods and may be any method capable of printing. Further, the printing machine 30 may be connected to a finisher (post-processing apparatus) for performing post-processing (post-processing) such as sheet folding, saddle stitching, case binding, and punching on printed recording media. The printing machine 30 may have, for example, a scanner function, a facsimile function, or a copy function.

When the printing machine 30 is a commercial printing device, the printing machine 30 is controlled by a digital front end (DFE). For this reason, the print controller 11, the printing machine 30, or a device independent thereof may include a DI-E. In the present embodiment, the print controller 11 includes a DFE. The DFE instructs the printing machine 30 to execute a job. When acquiring a job, the DFE uses a job definition format (JDF) and a page description language (PDL) to generate raster data for the printing machine 30 to form a toner image or an image with ink, and transmits the raster data to the printing machine 30.

The cloud system 50 is an information processing system having one or more information processing apparatuses that, upon receiving job information from an external information terminal 40, detects an idle time from schedule information of the printing machine 30 of each printing company 10, calculates a preparation time and an execution time of a received job, determines whether the received job can be executed within the idle time, and determines and distributes a printing company 10 that can execute the job. That is, the cloud system 50 provides the print service to the user of the external information terminal 40. Here, cloud is an abbreviation of cloud computing, and refers to a usage form in which resources on a network are used without being aware of specific hardware resources. Although the term cloud is used in contrast to the term on-premises, the cloud system 50 may be external or internal to an in-house LAN. One or more information processing apparatuses included in the cloud system 50 function as a server to provide various types of information and processing results in response to requests from clients.

In the determination, the cloud system 50 predicts the state of the printing machine 30 at the start time of the idle time, and predicts the preparation time based on the predicted state of the printing machine 30 and the state of the printing machine 30 set based on the received job information.

As illustrated in FIG. 1, the cloud system 50 includes a job management service 60, a device management service 70, a billing service 80, and a company management service 90. Each service is a function provided by the cloud system 50. In the cloud system 50, four servers respectively corresponding to the job management service 60, the device management service 70, the billing service 80, and the company management service 90 may exist, or one or more servers may implement the job management service 60, the device management service 70, the billing service 80, and the company management service 90. Applications respectively corresponding to the job management service 60, the device management service 70, the billing service 80, and the company management service 90 operate on the server, and the applications can communicate with each other. Each application communicates via, for example, a Web API. Although there is no strict definition in the Web API, it is an interface between applications or systems called over a network using a protocol such as Hypertext Transfer Protocol (HTTP).

The job management service 60 receives job information from an external information terminal 40, centrally manages the job information, refers to device information managed by the device management service 70, and distributes the job information to an appropriate printing company 10. Further, in order to use the print service provided by the cloud system 50 from the external information terminal 40, the job management service 60 publishes various Web APIs such as a job information registration API for requesting registration of a job, a confirmation notification API for confirming a print order to the presented printing company 10 (or the printing machine 30 thereof), and a job state notification API for confirming a progress status of the ordered job.

The device management service 70 receives the device information from each printing machine 30 and provides the device information to the job management service 60.

When the job is distributed to the printing company 10, the billing service 80 registers withdrawal information from the user (customer) of the information terminal 40 that has registered the job and deposit information to the printing company 10 that has received the distribution of the job.

The company management service 90 manages information of each printing company 10.

The outline of the operation of the device system 100 as described above is as follows. First, the printing machine 30 notifies the device management service 70 of device information such as configuration, setting, device state, job state, and statistical information periodically or when there is a system change. The device management service 70 holds the latest device information of the registered printing machine 30.

The information terminal 40 of a user who desires print output of a predetermined image file or the like registers a job in the job management service 60. Since the job management service 60 holds the state of the printing machine 30 held by the registered printing company 10 (the state indicated by the above-described device information) and a list of accepted jobs, the job management service 60 can search for a printing company 10 that can execute a new registered job by a desired delivery date.

The job management service 60 searches for a printing machine 30 of a printing company 10 suitable for executing the job, and distributes the job information to the printing company 10 having the printing machine 30. The printing machine 30 of the printing company 10 executes the job.

The billing service 80 withdraws the fee from the account of the user (customer) of the information terminal 40 based on the job execution completion notification notified from the printing machine 30 of the printing company 10, and pays the fee to the account of the printing company 10 that has executed the job.

With the above-described configuration, printing is performed using the printing machine 30 suitable for executing a job, and the operating rate of the printing machine 30 can be increased. Thus, profits can be distributed among the printing companies 10 that use the device system 100, while preventing opportunity loss.

Hardware Configuration of Print Controller and Cloud System

Figure 2:
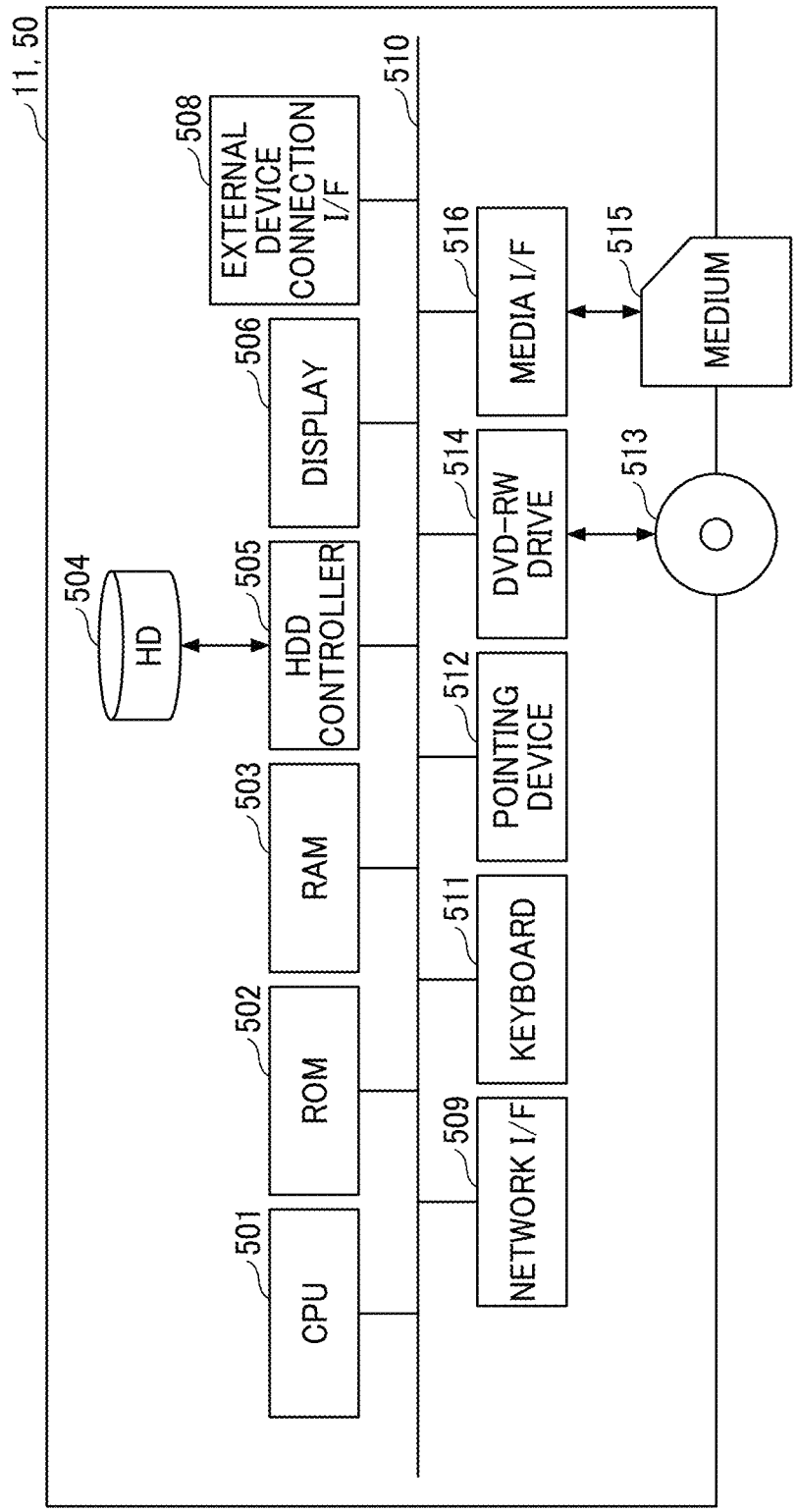
FIG. 2 is a diagram illustrating a hardware configuration of a print controller and a cloud system according to an embodiment of the present disclosure.

FIG. 2 is a diagram illustrating a hardware configuration of the print controller and the cloud system, according to an embodiment of the present disclosure. Hardware configurations of the print controller 11 and the cloud system 50 are described below with reference to FIG. 2. Specifically, a hardware configuration of the print controller 11 and an information processing apparatus configuring the cloud system 50 are described.

As illustrated in FIG. 2, the information processing apparatus includes a central processing unit (CPU) 501, a read-only memory (ROM) 502, a random access memory (RAM) 503, a hard disk (HD) 504, a hard disk drive (HDD) controller 505, a display 506, an external device connection interface (I/F) 508, a network I/F 509, a keyboard 511, a pointing device 512, a digital versatile disc-rewritable (DVD-RW) drive 514, and a media I/F 516. These devices are connected to each other by a bus line 510 such as an address bus and a data bus to enable data communication.

The CPU 501 is a computing device that controls the operation of the entire information processing apparatus. The ROM 502 is a nonvolatile storage device that stores a program used for driving the CPU 501, such as an initial program loader (IPL). The RAM 503 is a volatile storage device used as a working area of the CPU 501.

The HD 504 is a non-volatile auxiliary storage device that stores various programs. The HDD controller 505 is a controller that controls reading or writing of various types of information from or to the HD 504 under the control of the CPU 501.

The display 506 is a display device that displays various types of information such as a cursor, a menu, a window, characters, and an image. The external device connection I/F 508 is an interface for connecting various external devices. In this case, examples of the external devices include a universal serial bus (USB) memory and a printer. The network I/F 509 is an interface for performing data communication via the network N, and is an interface capable of performing communication conforming to, for example, Ethernet (registered trademark) or Transmission Control Protocol (TCP)/Internet Protocol (IP).

The keyboard 511 is an input device including a plurality of keys for inputting characters, numerical values, various instructions, and the like. The pointing device 512 is an input device such as a mouse for selecting and executing various instructions, selecting a processing object, moving a cursor, and the like.

The DVD-RW drive 514 is a device that controls reading and writing of various types of information from and to a DVD 513 such as a digital versatile disk-recordable (DVD-R) or a DVD-RW as an example of a removable recording medium. The media I/F 516 is an interface that controls reading or writing (storing) of information from or to a medium 515 such as a flash memory.

The cloud system 50 is often implemented by a virtual machine. A virtual machine refers to an information processing apparatus in a case where another operating system (OS) runs on a host OS.

In addition, the hardware configuration of the information processing apparatus configuring each of the print controller 11 and the cloud system 50 illustrated in FIG. 2 is an example. In other embodiments, the hardware configuration is not necessary to include all of the components illustrated in FIG. 2 or may include other components. It is needless to say that the information processing apparatuses constituting the print controller 11 and the cloud system 50 do not need to have the same hardware configuration.

Hardware Configuration of Printer

Figure 3:
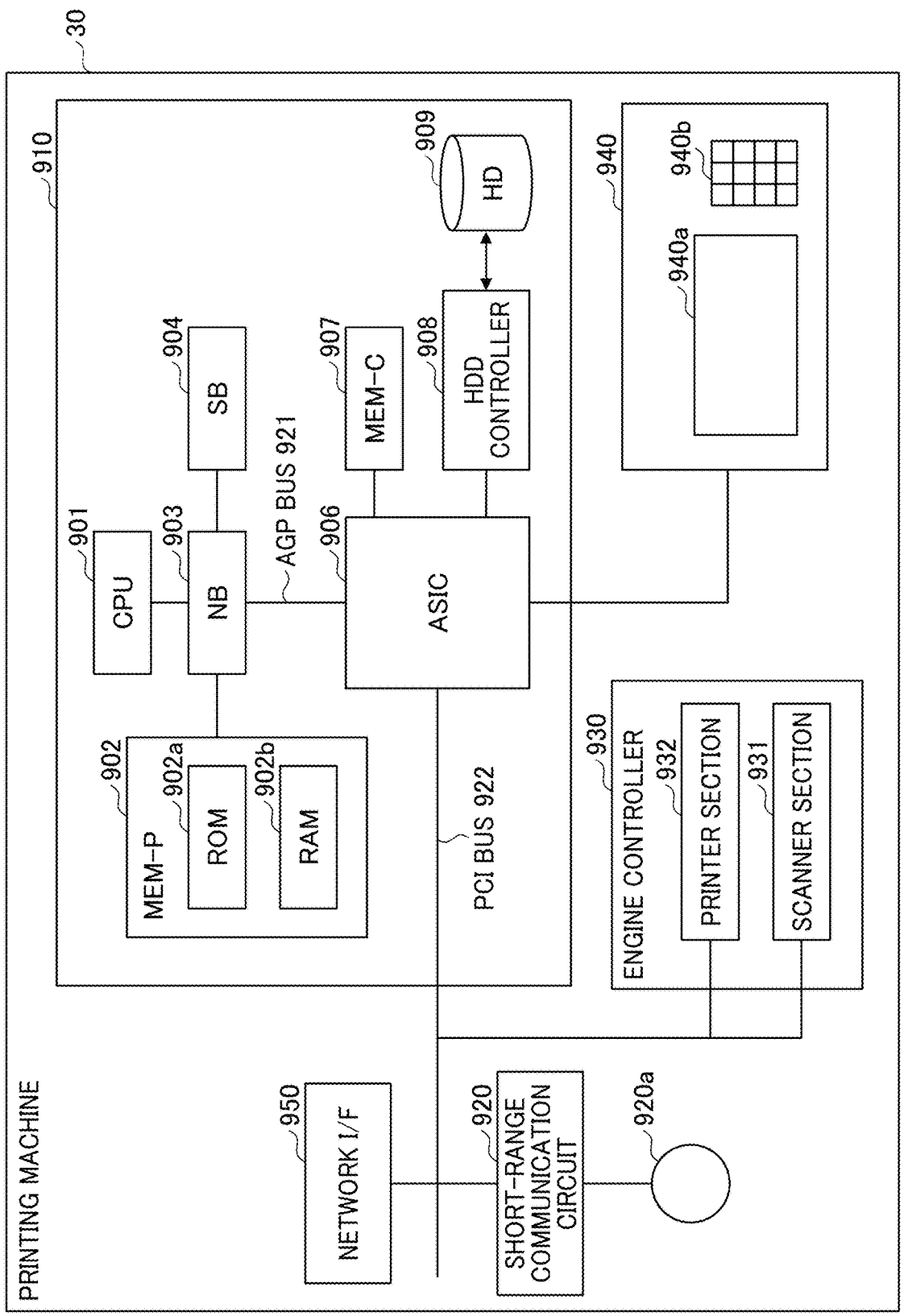
FIG. 3 is a diagram illustrating a hardware configuration of a printing machine according to an embodiment of the present disclosure.

FIG. 3 is a diagram illustrating an example of a hardware configuration of the printing machine. A hardware configuration of the printing machine 30 is described below with reference to FIG. 3.

As illustrated in FIG. 3, the printing machine 30 includes a controller 910, a short-range communication circuit 920, an engine controller 930, an operation panel 940, and a network I/F 950.

The controller 910 includes a CPU 901 that is a main part of a computer, a system memory (MEM-P) 902, a northbridge (NB) 903, a southbridge (SB) 904, an application specific integrated circuit (ASIC) 906, a local memory (MEM-C) 907, an HDD controller 908, and an HD 909. The NB 903 and the ASIC 906 are connected by an accelerated graphics port (AGP) bus 921.

The CPU 901 is a computing device that performs overall control of the printing machine 30. The NB 903 is a bridge for connecting the CPU 901 to the MEM-P 902, the SB 904, and the AGP bus 921, and includes a memory controller that controls reading and writing with respect to the MEM-P 902, a peripheral component interconnect (PCI) master, and an AGP target.

The MEM-P 902 includes a ROM 902a that is a memory for storing programs and data for implementing functions of the controller 910, and a RAM 902b that is used as a memory for drawing at the time of developing programs and data and memory printing. The program stored in the ROM 902a may be recorded and provided in a computer-readable recording medium such as a compact disc read only memory (CD-ROM), a compact disc recordable (CD-R), or a digital versatile disc (DVD) as a file in an installable format or an executable format.

The SB 904 is a bridge for connecting the NB 903 to PCI devices, peripheral devices, and the like. The ASIC 906 is an integrated circuit (IC) for use in image processing having hardware elements for image processing, and serves as a bridge for connecting the AGP bus 921, the PCI bus 922, the HDD controller 908, and the MEM-C 907. The ASIC 906 includes a PCI target and an AGP master, an arbiter (ARB) that is the core of the ASIC 906, a memory controller that controls the MEM-C 907, a plurality of direct memory access controllers (DMACs) that perform, for example, rotation of image data using hardware logic and the like, and a PCI unit that performs data transfer between the scanner section 931 and the printer section 932 via the PCI bus 922. Note that a universal serial bus (USB) interface or an institute of Electrical and Electronics Engineers (IEEE) 1394 interface may be connected to the ASIC 906.

The MEM-C 907 is a local memory used as an image buffer for copying and a code buffer. The HD 909 is a storage for storing image data, fonts used for printing, and forms. The HDD controller 908 is a controller that controls reading or writing from or to the CPU 901 under the control of the HD 909.

The AGP bus 921 is a bus interface for a graphics accelerator card, which has been proposed to speed up graphics processing, and can speed up the graphics accelerator card by directly accessing the MEM P902 with high throughput.

The short-range communication circuit 920 is a communication circuit such as Near Field Communication (NFC) or Bluetooth (registered trademark). The short-range communication circuit 920 is electrically connected to the ASIC 906 via the PCI bus 922. An antenna 920a for wireless communication is connected to the short-range communication circuit 920.

The engine controller 930 includes a scanner section 931 and a printer section 932. The scanner section 931 and the printer section 932 include an image processing function such as error diffusion or gamma conversion.

The operation panel 940 includes a screen display unit 940a and a hard key 940b. The screen display unit 940a such as a touch screen displays current setting values or a selection screen and receives an input from a user. The hard key 940b includes a numeric keypad that receives setting values of conditions related to image formation such as density setting conditions and a start key that receives a copy start instruction.

The printing machine 30 can sequentially switch and select a document box function, a copy function, a printer function, and a fax function by using an application switching key of the operation panel 940. A document box mode is selected when the document box function is selected, a copy mode is selected when the copy function is selected, a printer mode is selected when the printer function is selected, and a fax mode is selected when the fax function is selected.

The network I/F 950 is an interface for performing data communication via the network N, and is, for example, an interface capable of performing communication conforming to Ethernet, TCP/IP, or the like. The network I/F 950 is electrically connected to the ASIC 906 via the PCI bus 922.

Note that the hardware configuration of the information processing apparatus configuring the printing machine 30 illustrated in FIG. 3 is an example. In other embodiments, the hardware configuration is not necessary to include all of the components illustrated in FIG. 3 or may include other components.

Hardware Configuration of Information Terminal

Figure 4:
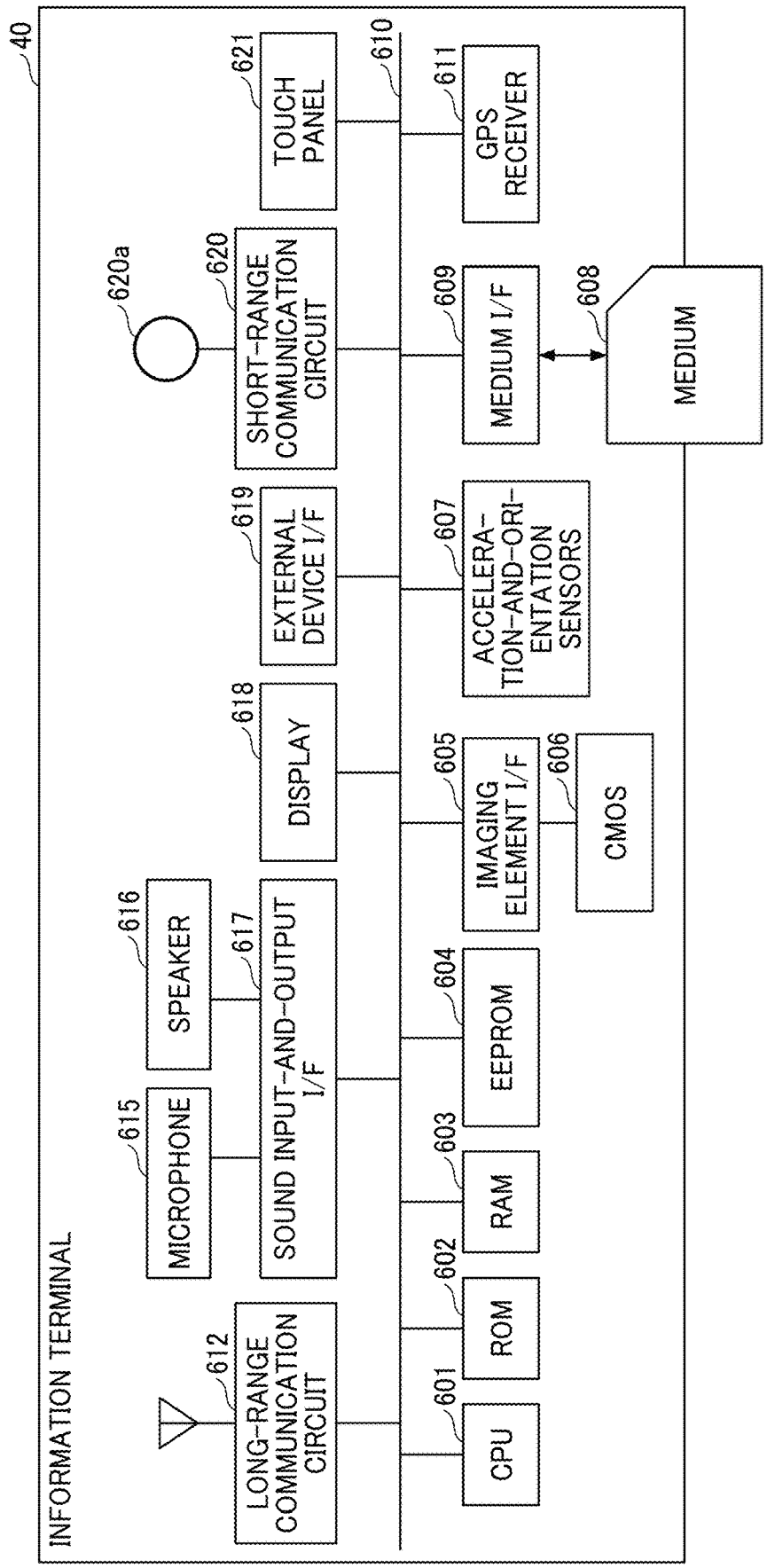
FIG. 4 is a diagram illustrating a hardware configuration of an information terminal according to an embodiment of the present disclosure.

FIG. 4 is a diagram illustrating a hardware configuration of an information terminal according to an embodiment of the present disclosure. The hardware configuration of the information terminal 40 is described below with reference to FIG. 4.

As illustrated in FIG. 4, the information terminal 40 includes a CPU 601, a ROM 602, a RAM 603, an electrically erasable programmable read-only memory (EEPROM) 604, a complementary metal-oxide-semiconductor (CMOS) 606, an imaging element I/F 605, an acceleration-orientation sensor 607, a media I/F 609, and a global positioning system (GPS) receiver 611. These devices are connected to each other by a bus line 610 such as an address bus and a data bus to enable data communication.

The CPU 601 is a computing device that controls the overall operation of the information terminal 40. The ROM 602 is a nonvolatile storage device that stores a program used to drive the CPU 601, such as an IPL. The RAM 603 is a volatile storage device used as a working area of the CPU 601. The EEPROM 604 is a non-volatile storage device that reads or writes various programs for the information terminal 40 under the control of the CPU 601.

The CMOS 606 is a built-in imaging apparatus that, under the control of the CPU 601, captures an image of a subject to obtain image data. Note that an imaging device such as a charge coupled device (CCD) may be used instead of the CMOS. The image sensor I/F 605 is a circuit that controls driving of the CMOS 606.

The acceleration-and-orientation sensors 607 are various sensors such as an electronic magnetic compass for detecting geomagnetism, a gyro compass, and an acceleration sensor. The media I/F 609 is an interface that controls reading or writing (storing) of information from or to a medium 608 such as a flash memory.

The GPS receiver 611 is a circuit that receives GPS signals from a GPS satellite.

As illustrated in FIG. 4, the information terminal 40 includes a long-range communication circuit 612, a microphone 615, a speaker 616, a sound input-and-output I/F 617, a display 618, an external device I/F 619, a short-range communication circuit 620, and a touch screen 621. These devices are connected to each other by a bus line 610 such as an address bus and a data bus to enable data communication.

The long-distance communication circuit 612 is a circuit that communicates with other devices via the network N.

The microphone 615 is a built-in circuit that converts sound into an electric signal. The speaker 616 is a built-in circuit that converts signals into physical vibrations to produce sounds such as music and voice. The sound input-and-output I/F 617 is a circuit that processes input and output of sound signals between the microphone 615 and the speaker 616 according to the control of the CPU 601.

The display 618 is a display device such as a liquid crystal display or an organic electro luminescence (EL) display that displays, for example, an image of a subject and various icons. The external device connection I/F 619 is an interface for connecting various external devices. The short-range communication circuit 620 is a communication circuit such as NFC or Bluetooth. The touch screen 621 is an input device for a user to touch the display 618 to operate the information terminal 40.

Note that the hardware configuration of the information terminal 40 illustrated in FIG. 4 is an example. In other embodiments, the information terminal 40 need not include all of the components illustrated in FIG. 4 or may include other components.

Configuration and Operation of Functional Blocks of Device System

Figure 5:
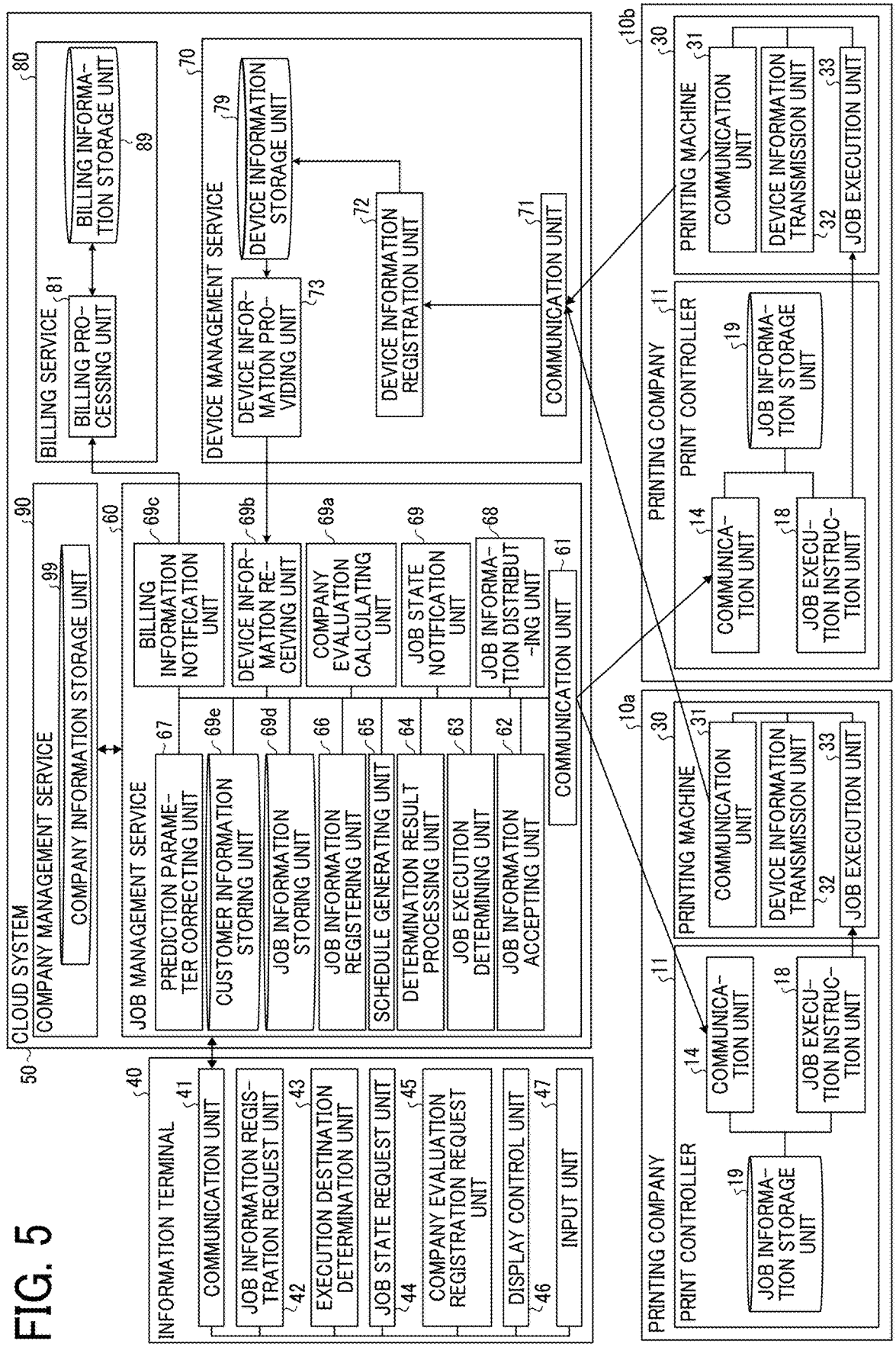
FIG. 5 is a diagram illustrating a configuration of functional blocks of a device system according to an embodiment of the present disclosure.
Figure 15:
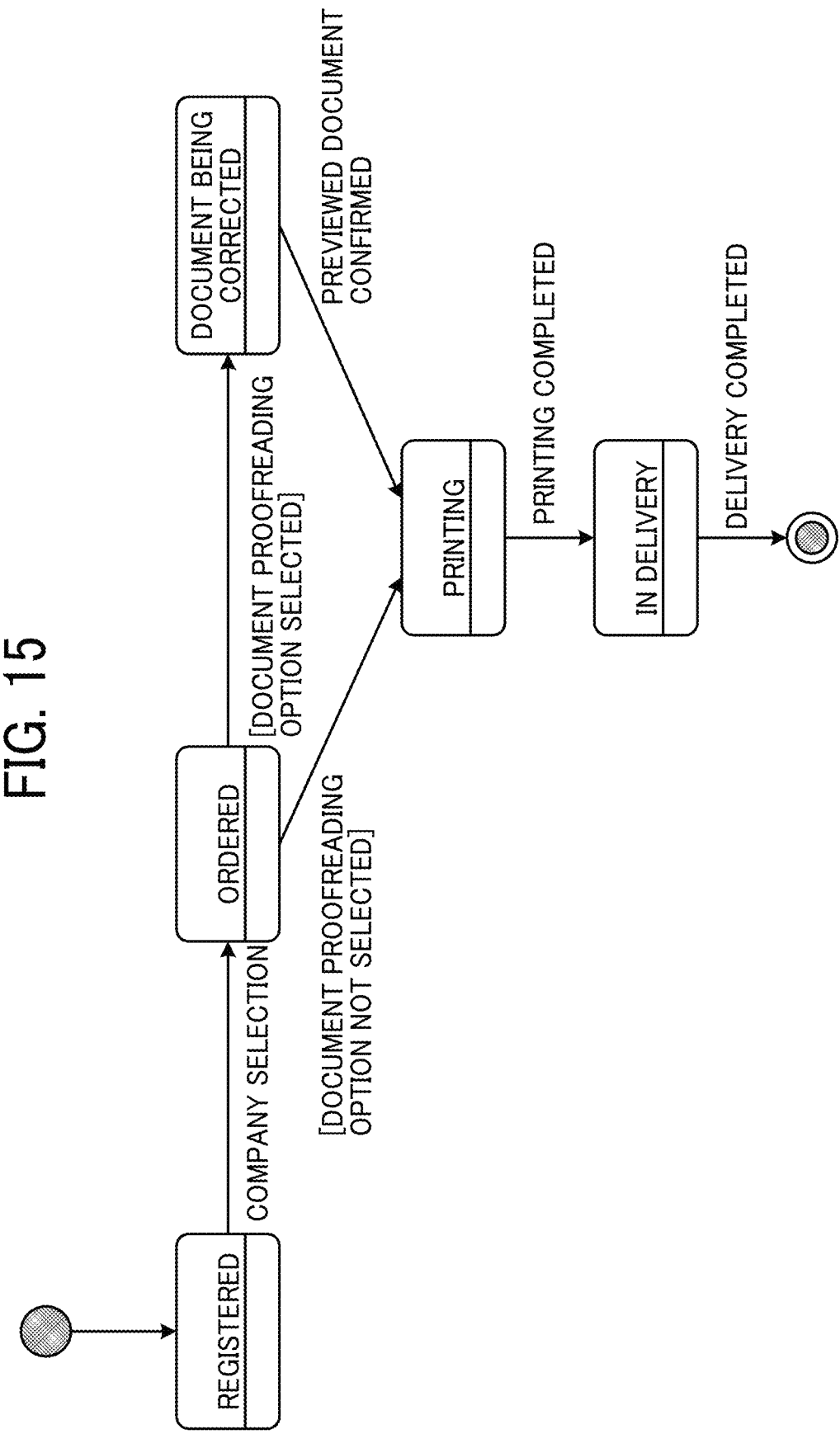
FIG. 15 is a diagram illustrating an example of state transition for a job.

FIG. 5 is a diagram illustrating an example of a configuration of functional blocks of the device system according to an embodiment of the present disclosure. FIG. 6 is a diagram illustrating an example of the job information registration API. FIG. 7 is a diagram illustrating an example of a response of the job information registration API. FIG. 8 is a diagram illustrating an example of another response of the job information registration API. FIG. 9 is a diagram illustrating an example of the confirmation notification API. FIG. 10 is a diagram illustrating an example of a response of the confirmation notification API. FIG. 11 is a diagram illustrating an example of another confirmation notification API. FIG. 12 is a diagram illustrating an example of a response of the confirmation notification API illustrated in FIG. 11. FIG. 13 is a diagram illustrating an example of the job state notification API. FIG. 14 is a diagram illustrating an example of a response of the job state notification API. FIG. 15 is a diagram illustrating an example of state transition for a job. The configuration and operations of functional blocks of the device system 100 are described below with reference to FIGS. 5 to 15.

Print Controller

As illustrated in FIG. 5, the print controller 11 of the printing company 10 includes a communication unit 14, a job execution instruction unit 18, and a job information storing unit 19.

When job information and schedule information are distributed from the job management service 60, the job execution instruction unit 18 instructs the printing machine 30 to execute a job based on the schedule information.

The communication unit 14 is a functional unit that transmits and receives various types of information to and from the job management service 60. The communication unit 14 receives job information and schedule information from the job management service 60. The communication unit 14 is implemented by executing a program by, for example, the network I/F 509 and the CPU 501 illustrated in FIG. 2.

The job information storing unit 19 is a functional unit that stores job information received by the communication unit 14. The job information storing unit 19 is implemented by at least one of the RAM 503 and the HD 504 illustrated in FIG. 2. The job information stored in the job information storing unit 19 is the same as job information of the job management service 60 described below.

The job execution instruction unit 18 is implemented, for example, by executing a program by the CPU 501 illustrated in FIG. 2. The job execution instruction unit 18 may be implemented by an integrated circuit such as a field-programmable gate array (FPGA) or an ASIC, instead of a program that is software.

Each functional unit of the print controller 11 illustrated in FIG. 5 conceptually illustrates a function, and is not limited to such a configuration. For example, a plurality of functional units illustrated as independent functional units in the print controller 11 illustrated in FIG. 5 may be configured as one functional unit. On the other hand, the print controller 11 illustrated in FIG. 5 may be configured as a plurality of functional units by dividing the function of one functional unit into a plurality of functions.

Printing Machine

As illustrated in FIG. 5, the printing machine 30 of the printing company 10 includes a communication unit 31, a device information transmission unit 32, and a job execution unit 33.

The job execution unit 33 is a functional unit that executes a job in response to a job execution instruction from the job execution instruction unit 18. For example, the job execution unit 33 causes the printer section 932 to print out the print data included in the job information on a recording medium such as a sheet of paper.

The device information transmission unit 32 is a functional unit that transmits device information related to the printing machine 30 to the device management service 70 via the communication unit 31. The device information includes, for example, a configuration such as a printing speed of the printing machine 30, settings such as sheet type and size, a state of the printing machine 30 such as an operating state or a failure state, and schedule information indicating how many jobs are input. Furthermore, the device information includes statistical information related to the operation and maintenance of the printing machine 30, such as the operating rate of the printing machine 30, a maintenance status indicating whether inspection, cleaning, component replacement, and the like are performed as planned, and the efficiency of print preparation for each job (for example, information on whether the print preparation is not too long compared to the printing time). The content of the device information will be described below in the cloud system 50.

The communication unit 31 is a functional unit that transmits and receives various types of information to and from the device management service 70. For example, the communication unit 31 transmits the device information to the device management service 70 under the control of the device information transmission unit 32. The communication unit 31 is implemented by executing a program by, for example, the network I/F 950 and the CPU 901 illustrated in FIG. 3.

The device information transmission unit 32 and the job execution unit 33 described above are implemented, for example, by executing a program by the CPU 901 illustrated in FIG. 3. Some or all of these functional units may be implemented by an integrated circuit(s) such as an FPGA or an ASIC, instead of a program(s) that is software.

Each functional unit of the printing machine 30 illustrated in FIG. 5 conceptually illustrates a function, and is not limited to such a configuration. For example, a plurality of functional units illustrated as independent functional units in the printing machine 30 illustrated in FIG. 5 may be configured as one functional unit. On the other hand, in the printing machine 30 illustrated in FIG. 5, the functions of one functional unit may be divided into a plurality of functional units.

Information Terminal

As illustrated in FIG. 5, the information terminal 40 includes a communication unit 41, a job information registration request unit 42, an execution destination determination unit 43, a job state request unit 44, a company evaluation registration request unit 45, a display control unit 46, and an input unit 47.

The communication unit 41 is a functional unit that transmits and receives various types of information to and from the job management service 60 of the cloud system 50. For example, in order to execute various Web APIs published by the job management service 60, the communication unit 41 transmits an HTTP request (hereinafter, may be simply referred to as a request) including various methods based on the HTTP protocol to the job management service 60. The communication unit 41 is implemented by, for example, the long-distance communication circuit 612 illustrated in FIG. 4 and the CPU 601 executing a program (application).

The job information registration request unit 42 is a functional unit that transmits, to the job management service 60 via the communication unit 41, a request for registration of job information including various types of information such as print data for requesting printing, which is input via the input unit 47 in order to use the print service provided by the cloud system 50. Specifically, for example, the job information registration request unit 42 transmits a request of the job information registration API, which is an API for registering job information as illustrated in FIG. 6, to the job management service 60.

The job information registration API illustrated in FIG. 6 includes, for example, the following information as input parameters to be transmitted to the job management service 60.

"productTypeId" (product type ID): "book-hardcover" (hard cover)
"printQuality" (image quality request): "normal" (usual)
"desiredDeliveryDate" (desired delivery date): "2020-01-31"
"dataSource" (print data): "https://www.example.com/images/xxxx-xxxx-xxxx.pdf"
"customer" (customer)
"name" "Ricoh Taro"
"address" (address): "AAA, Ebina City, Kanagawa"
"country" (country): "Japan"
"email" (mail address): "TaroRicoh@ricoh.example.com"
"numberOfCopies" (number of copies): 1

Note that the HTTP headers "X-Application-ID" and "X-Application-Key" included in each HTTP request illustrated in FIG. 6 and FIGS. 9, 11, and 13 described below are an identifier and an authentication key for identifying an application operating on the information terminal 40 connected to the cloud system 50. The cloud system 50 has a login function of receiving an input (such as a user ID and a password) for identifying a user who operates the information terminal 40 and authenticating the user. The information terminal receives session information from the cloud system 50 as a result of authentication, and adds the received session information to a subsequent HTTP request as, for example, a cookie header.

As illustrated in FIG. 6, the print data does not need to be directly included in the request of the job information registration API, and a uniform resource locator (URL) storing the print data may be designated. As the image quality request, not only high, medium, and low levels may be designated, but also, for example, sheet type, color, content type such as person, landscape, and character photograph, purpose of distribution of printed matter such as birthday, ceremonial occasion, and advertisement, or information such as presence or absence of correction and proofreading by a professional designer may be designated. The input parameters included in the request of the job information registration API are not limited to the above-described information.

In response to the request of the job information registration API, the job information registration request unit 42 receives, from the job management service 60 via the communication unit 41, a response indicating that the printing company 10 that executes the job information has been determined. Specifically, the job information registration request unit 42 receives, for example, the response illustrated in FIG. 7 as a response to the request of the job information registration API. The response illustrated in FIG. 7 includes, for example, the following parameters in addition to "productTypeId", "printQuality", "desiredDeliveryDate", "dataSource", "customer", and "numberOfCopies" which are input parameters of the job information registration API illustrated in FIG. 6.

"jobId" (job ID): "xxxx-xxxx-xxxx"
"expectedDeliveryDate" (scheduled delivery date): "2020-1-30"
"price": 4000
"currency": "JPY"
"status" (status): "registered" (registered)

The job ID is identification information for uniquely identifying job information to be issued when the job information is newly registered in the job management service 60. The scheduled delivery date is a delivery date scheduled until the printed matter output by the execution of the job is delivered to the address of the user (customer). The status is information indicating a progress state of the job after the job information is registered in the job management service 60, and will be described in detail below. The response illustrated in FIG. 7 described above does not include information indicating one printing company 10 that executes a job (and the printing machine 30 that actually executes the job) since the printing company 10 is determined in the job management service 60.

The response to the request of the job information registration API is not limited to a response indicating that one printing company 10 and one printing machine 30 are determined as illustrated in FIG. 7, and may be, for example, a response indicating candidates of a plurality of printing companies 10 capable of executing a job as illustrated in FIG. 8. The response illustrated in FIG. 8 includes, for example, the following parameters in addition to the input parameters "productTypeId", "printQuality", "desiredDeliveryDate", "dataSource", "customer", and "numberOfCopies" of the job information registration API illustrated in FIG. 6.

"jobId" (job ID): "xxxx-xxxx-xxxx"
"shopCandidates"
"shopID" (shopID): "xxxx-xxxx"
"shopName" (shop name): "XXX print"
"expectedDeliveryDate" (scheduled delivery date): "2020-1-30"
"price": 4000
"currency": "JPY"
"evaluation" (evaluation value): 80
"shopID" (shop ID): "yyy-yyyy"
"shopName" (shop name): "YYY print"
"expectedDeliveryDate" (scheduled delivery date): "2020-1-31"
"price": 3800
"currency": "JPY"
"evaluation" (evaluation value): 65

In the example of the response illustrated in FIG. 8, two candidates of the printing company 10 capable of executing the job are illustrated. Among the parameters of the candidates, the shop ID is identification information for identifying the printing company 10 that executes the job. The shop name is the name of the printing company 10 that executes the job. The evaluation value is a value indicating an evaluation of the user (customer) with respect to the printing company 10 that executes the job, and will be described in detail below. The information on the plurality of printing companies 10 capable of executing the job included in the response illustrated in FIG. 8 may include not only the above-described information but also, for example, information such as product type, product attribute, and image quality area of specialty. In the example of the response illustrated in FIG. 8, an example is illustrated in which candidates of a plurality of printing companies 10 are included. However, embodiments of the present disclosure are not limited thereto, and information indicating different printing machines 30 may be included even in the same printing company 10. In this case, identification information for identifying the printing machine 30 may be included in addition to the shop ID and the shop name. That is, the user can select any one of the plurality of printing machines 30 of the printing company 10 even if the printing company 10 is the same.

The execution destination determination unit 43 is a functional unit that receives a response from the job management service 60 in response to the request of the job information registration API by the job information registration request unit 42 and transmits, to the job management service 60 via the communication unit 41, a request for notifying the printing company indicated by the response of the confirmation of the job execution request, in accordance with an operation input to the input unit 47.

For example, when the communication unit 41 receives a response to the job information registration API as illustrated in FIG. 7, the execution destination determination unit 43 notifies the job management service 60 of a request of the confirmation notification API that is an API for notifying confirmation of a request for execution of a job with contents indicated by the response, as illustrated in FIG. 9. The confirmation notification API illustrated in FIG. 9 includes, for example, the following information as input parameters to be transmitted to the job management service 60.

"jobId" (job ID): "xxxx-xxxx-xxxx"
"status": "Ordered"

Among the parameters, for the job identified by the job ID, a transition to the next progress state is set as a status (here, "ordered").

In response to the request of the confirmation notification API illustrated in FIG. 9, the execution destination determination unit 43 receives a response indicating that the confirmation notification is received as illustrated in FIG. 10 from the job management service 60 via the communication unit 41. The response illustrated in FIG. 10 includes, for example, the following parameters in addition to "jobID", "productTypeId", "printQuality", "desiredDeliveryDate", "dataSource", "customer", "numberOfCopies", "expectedDeliveryDate", "price", and "currency" illustrated in FIG. 7.

"status": "Ordered"

In this case, the status indicates that the execution order of the job identified by the job ID has been confirmed with the content indicated by the response illustrated in FIG. 7.

When the communication unit 41 receives a response to the job information registration API illustrated in FIG. 8 (in other words, a response indicating candidates of a plurality of printing companies 10 that can executed the job), the execution destination determination unit 43 notifies the job management service 60 of a request for the confirmation notification API for notifying confirmation of a job execution request for the printing company 10 selected by an operation on the input unit 47 from among the candidates of the printing companies 10 indicated by the response, for example, as illustrated in FIG. 11.

The confirmation notification API illustrated in FIG. 11 includes, for example, the following information as input parameters to be transmitted to the job management service 60.

"jobId" (job ID): "xxxx-xxxx-xxxx"
"shopID" (shop ID): "yyyy-yyyy"

In this case, the shop ID indicates identification information for identifying the printing company 10 (here, "YYY printing") requested to execute the job identified by the job ID.

In response to the request of the confirmation notification API illustrated in FIG. 11, the execution destination determination unit 43 receives a response indicating that the confirmation notification is received as illustrated in FIG. 12, from the job management service 60 via the communication unit 41. The response illustrated in FIG. 12 includes, for example, the following parameters in addition to "jobID", "productTypeId", "printQuality", "desiredDeliveryDate", "dataSource", "customer", "numberOfCopies", "shopID", "shopName", "expectedDeliveryDate", "price", and "currency" illustrated in FIG. 8.

"status": "Ordered"

In this case, the status indicates that the order for execution of the job identified by the job ID in the printing company 10 indicated by the confirmation notification API illustrated in FIG. 11 has been confirmed.

The job state request unit 44 is a functional unit that transmits a request for inquiring about the progress state of a job to the job management service 60 via the communication unit 41 in accordance with an operation input to the input unit 47 after the execution destination determination unit 43 determines the printing company 10 that executes the job. Specifically, the job state request unit 44 transmits, for example, a request of the job state notification API that is an API for inquiring a progress state of a job as illustrated in FIG. 13 to the job management service 60.

In the job state notification API illustrated in FIG. 13, a job is specified by "xxxx-xxxx-xxxx" that is a job ID defined after "jobs". Note that the method of specifying a job is not limited to this, and "jobID" may be included and specified as an input parameter.

The job state request unit 44 receives a response indicating the progress state of the job from the job management service 60 via the communication unit 41 in response to the request of the job state notification API. Specifically, the job state request unit 44 receives, for example, a response as illustrated in FIG. 14 as a response to the request of the job state notification API. The response illustrated in FIG. 14 includes, for example, the following parameters in addition to the above-described "jobID", "productTypeId", "printQuality", "desiredDeliveryDate", "dataSource", "customer", "numberOfCopies", "expectedDeliveryDate", "price", and "currency".

"status": "printing"
"detail": "Preparing to print"

Among the parameters, the status indicates the progress state of the current job. In the example illustrated in FIG. 14, the status indicates "printing". In addition, "detail" is information indicating a more detailed state regarding the progress state of the job indicated by the status, and indicates "preparing to print" (print preparation in progress) in the example illustrated in FIG. 14. The detailed state may also include, for example, information such as "waiting for schedule", "the number of pages or copies currently being printed", or "during post-process execution". Further, when the status is "in delivery", information such as "in preparation for shipment", the current position of the transportation vehicle, or "delivered" may be included as the detailed state. As described above, the job state request unit 44 can acquire the progress state of the ordered job, and the user (customer) can recognize the state of the job ordered by the user at any time. Such a configuration can eliminate uneasiness or the like of the user due to waiting for printing, thereby enhancing convenience.

Note that the response illustrated in FIG. 14 may include a shop ID, a shop name, and the like of a shop requested to execute a job.

The company evaluation registration request unit 45 is a functional unit that transmits, to the job management service 60 via the communication unit 41, a request for requesting registration of an evaluation value for the printing company 10 that has been requested to execute a job (printing of print data) in the past, in accordance with an operation input to the input unit 47. For example, the company evaluation registration request unit 45 transmits, to the job management service 60, an API request for requesting registration of an evaluation value for the printing company 10 that has been requested to execute a past job. The API may include, for example, the following information as input parameters to be transmitted to the job management service 60.

"jobId" (job ID): "xxxx-xxxx-xxxx" "evaluation" (evaluation value)

The evaluation value is an evaluation score input by the user (customer) to the printing company 10 that has executed the job identified by the job ID in the past.

The company evaluation registration request unit 45 receives a response indicating that the registration of the evaluation value is accepted, from the job management service 60 via the communication unit 41, in response to the request of the API for requesting the registration of the evaluation value.

The display control unit 46 is a functional unit that controls a display operation of the display 618. The input unit 47 is a functional unit that receives an operation input from a user. The input unit 47 is implemented by the touch screen 621 illustrated in FIG. 4.

The job information registration request unit 42, the execution destination determination unit 43, the job state request unit 44, the company evaluation registration request unit 45, and the display control unit 46 described above are implemented by, for example, executing programs (application) by the CPU 601 illustrated in FIG. 4. Some or all of these functional units may be implemented by an integrated circuit(s) such as an FPGA or an ASIC, instead of programs (application) that is software.

Each functional unit of the information terminal 40 illustrated in FIG. 5 conceptually illustrates a function, and is not limited to such a configuration. For example, a plurality of functional units illustrated as independent functional units in the information terminal 40 illustrated in FIG. 5 may be configured as one functional unit. On the other hand, in the information terminal 40 illustrated in FIG. 5, a function of one functional unit may be divided into a plurality of functional units. The information terminal 40 may include a Web browser, and the job information registration request unit 42, the execution destination determination unit 43, the job state request unit 44, the company evaluation registration request unit 45, and the display control unit 46 may be implemented by using HyperText Markup Language (HTML), Cascading Style Sheets (CSS), JavaScript (registered trademark), or the like acquired from the job management service 60 by the Web browser.

Job Management Service

The job management service 60 of the cloud system 50 includes a communication unit 61 (serving as a receiving unit), a job information accepting unit 62 (serving as an accepting unit), a job execution determining unit 63 (serving as a determining unit), a determination result processing unit 64 (serving as a presenting unit and a confirming unit), a schedule generating unit 65, a job information registering unit 66, a prediction parameter correcting unit 67, a job information distributing unit 68 (serving as a distributing unit), a job state notification unit 69 (serving as a notification unit), a company evaluation calculating unit 69a (serving as a calculating unit), a device information receiving unit 69b (serving as an acquiring unit), a billing information notification unit 69c, a job information storing unit 69d, and a customer information storing unit 69e, as illustrated in FIG. 5.

The communication unit 61 is a functional unit that transmits and receives various types of information to and from the print controller 11 of the printing company 10. For example, the communication unit 61 transmits (distributes) job information to the print controller 11. Further, the communication unit 61 receives a job execution completion notification from the print controller 11. The communication unit 61 is implemented, for example, by executing a program by the network I/F 509 and the CPU 501 illustrated in FIG. 2.

The job information accepting unit 62 is a functional unit that receives registration of job information from the information terminal 40. Specifically, the job information accepting unit 62 receives, via the communication unit 61, a request for the job information registration API transmitted by the job information registration request unit 42 of the information terminal 40. The contents of the job information are described below.

The job execution determining unit 63 is a functional unit that determines which printing company 10 is to execute the job received by the job information accepting unit 62 (or which printing machine 30 held by the printing company 10 is to perform print processing). For example, the job execution determining unit 63 predicts the state of the printing machine 30 at the start of the idle time from the current state of the printing machine 30 of each printing company 10 and the schedule information scheduled to execute the job, and determines whether the newly received job can be completed by the end of the idle time. In addition, the job execution determining unit 63 determines the printing company 10 that executes the job in consideration of information (characteristic information) indicating the characteristics of the printing company 10 such as the product type and product attribute of each printing company 10 acquired from the company information storage unit 99 of the company management service 90. Furthermore, the job execution determining unit 63 analyzes the job execution state of the print controller 11 of each printing company 10 based on statistical information included in the device information received by the device information receiving unit 69b, and determines the printing machine 30 of the printing company 10 that can be scheduled to be efficiently used. For example, the job execution determining unit 63 calculates an evaluation value (hereinafter, may be referred to as a system evaluation value) for each printing company 10 (and each printing machine 30) based on the statistical information from the viewpoints that the operating rate of the printing machine 30 is high (idle period is short), maintenance of the printing machine 30 is performed in a planned manner, the time required for print preparation is short, the number of reruns of jobs is small, and scheduling can be performed so that the operating rate of each printing machine 30 as a whole is high. The job execution determining unit 63 determines which printing company 10 is to executed the job, based on the predicted state of the printing machine 30 and the calculated system evaluation value. Note that the job execution determining unit 63 may cause a plurality of printing companies 10 to execute the job or may cause a plurality of printing machines 30 in the same printing company 10 to execute the job. The job execution determining unit 63 may calculate the system evaluation value by further taking into account a user evaluation value (described below) of the printing company 10 stored in the company information storage unit 99 of the company management service 90.

The determination result processing unit 64 is a functional unit that transmits a response to the request of the job information registration API received by the job information accepting unit 62, to the information terminal 40 via the communication unit 61. Specifically, the determination result processing unit 64 transmits, to the information terminal 40, the above-described response illustrated in FIG. 7 indicating that the job information accepting unit 62 has received the request of the job information API and the job execution determining unit 63 has determined the printing company 10 (and the printing machine 30) that executes the job information included in the request. When the job execution determining unit 63 determines a plurality of printing companies 10 or a plurality of printing machines 30, the determination result processing unit 64 transmits, to the information terminal 40, a response indicating candidates for a plurality of printing companies 10 or a plurality of printing machines 30 that can execute the job as illustrated in FIG. 8.

In a case where the determination result processing unit 64 receives a request of the confirmation notification API from the information terminal 40 via the communication unit 61, the determination result processing unit 64 transmits a response to the request to the information terminal 40 via the communication unit 61. Specifically, when receiving the request of the confirmation notification API illustrated in FIG. 9 or 11, the determination result processing unit 64 confirms that the printing company 10 (or the printing machine 30) indicated by the request is the printing company 10 (or the printing machine 30) that executes the job, sets the parameter "status" to "ordered" in the response illustrated in FIG. 10 or 12, and transmits the response to the information terminal 40.

The schedule generating unit 65 is a functional unit that generates schedule information when the determination result processing unit 64 determines the printing company 10 that executes the job information. Although details of the schedule information are described below, the schedule information is information indicating a schedule of from when to when to execute a job.

The job information registering unit 66 is a functional unit that sets information included in the request of the job information registration API received by the job information accepting unit 62 as job information, includes a status of "order completed" and schedule information generated by the schedule generating unit 65 in the job information, and stores the job information in the job information storing unit 69d. An example of the job information stored in the job information storing unit 69d is illustrated in Table 1 including Table 1-1 and Table 1-2 below.

TABLE 1-1

| Job ID | Sheet of Paper | Number of Sheets | Image Quality Request | Desired Delivery Date | Print data |
|---|---|---|---|---|---|
| J001 | Gross paper | 500 | High image quality | 20xx/MM/DD hh:mm | ***.data |
| J002 | Plain paper | 700 | Moderate image quality | 20xx/MM/DD hh:mm | ***.data |

TABLE 1-2

| Job ID | Customer Information | Schedule Information | Log | Status |
|---|---|---|---|---|
| J001 | Customer A | K001 20xx/MM/DD hh.mm to hh.mm | hh.mm to hh.mm | Ordered |
| J002 | Customer B | K001 20xx/MM/DD hh.mm to hh.mm | hh.mm to hh.mm | In printing |

The job information may include not only the information illustrated in Table 1 described above but also other information (for example, information of "detail" described above).

The job information distributing unit 68 is a functional unit that transmits (distributes) job information including schedule information to the print controller 11 of the printing company 10 determined by the determination result processing unit 64 via the communication unit 61.

When the communication unit 61 receives a request of the job state notification API from the information terminal 40, the job state notification unit 69 refers to the job information storing unit 69d, extracts the status and details of the job indicated by the request, includes the status in a response to the request, and transmits the response to the information terminal 40 via the communication unit 61. Specifically, the job state notification unit 69 transmits a response including "status" and "detail" as illustrated in FIG. 14 described above to the information terminal 40.

When the communication unit 61 receives an API request for registration of an evaluation point from the information terminal 40, the company evaluation calculating unit 69a refers to the company information storage unit 99 of the company management service 90, extracts the current evaluation value of the printing company 10 that executed the job indicated by the request in the past, and calculates a new evaluation value based on the evaluation value and the evaluation value included in the request. The company evaluation calculating unit 69a stores the calculated evaluation value (hereinafter, may be referred to as a user evaluation value) in the company information storage unit 99 as a new evaluation value of the printing company 10 in association with the printing company 10. Then, in response to the request received by the communication unit 61, the company evaluation calculating unit 69a transmits a response indicating that the registration of the evaluation value has been accepted, to the information terminal 40 via the communication unit 61. In addition to the evaluation value included in the request and the current user evaluation value stored in the company information storage unit 99, the job execution determining unit 63 may also take into account the system evaluation value calculated from the statistical information as described above to calculate a new user evaluation value.

The device information receiving unit 69b is a functional unit that receives device information from the device management service 70. The device management service 70 may transmit the device information to the job management service 60 each time new device information is received, or may transmit the device information to the job management service 60 periodically or when the load is small. Alternatively, the device information receiving unit 69b may request the device management service 70 for device information and receive the device information as a result of the request. In this case, the device information receiving unit 69b may also request device information periodically or when the load is small The billing information notification unit 69c is a functional unit that, when a job is registered from the information terminal 40 (or when the job is executed), notifies the billing service 80 of withdrawal information from a user (customer) of the information terminal 40 that registered the job and deposit information to the printing company 10 to which the job is distributed.

The prediction parameter correcting unit 67 is a functional unit that receives a job execution completion notification from the print controller 11 after execution of a job, accumulates the job execution completion notification, and corrects a prediction parameter based on a past execution result. Here, the prediction parameter is a parameter for predicting a preparation time, an execution time, and the like of a job from job information, device information, and the like.

The job information storing unit 69d is a functional unit that stores job information as illustrated in Table 1 above. The job information storing unit 69d is implemented by at least one of the RAM 503 or the HD 504 illustrated in FIG. 2. As illustrated in Table 1, the job information includes, for example, a job ID, a sheet of paper, the number of sheets, an image quality request, a desired delivery date, print data, customer information, schedule information, a log, and a status. The job ID is identification information for identifying the job information. The sheet of paper is the grade and type of sheet of paper required for this job. The number of sheets is the number of copies to be printed in the job. The image quality request is an image quality (for example, resolution) required for a printed matter. The desired delivery date is a delivery date of the printed matter desired by the customer. The print data is data to be printed and includes, for example, JDF and PDL. The customer information is information for specifying a customer who has requested the job. The schedule information is information indicating when the printing machine 30 to which the job is assigned (K001 represents the printing machine 30) starts and ends execution of the job. The log includes a start time and an end time at which the job is actually executed, and is also included in the job execution completion notification. The status is information indicating a current progress state of the job. The job information may include information other than the above-described information (for example, detailed information illustrated in FIG. 14).

Here, the state transition of the progress state of a job is described with reference to FIG. 15. As described above, the progress state of the job is reflected in the status included in the job information. The status of "registered" is a progress state in which job information is received by the job information accepting unit 62 and the printing machine 30 of the printing company 10 that executes the job is determined by the job execution determining unit 63. The status of "registered" may be set when the job information is received by the job information accepting unit 62. When the printing company 10 (or the printing machine 30) that executes the job is determined by the determination result processing unit 64, the status transitions from "registered" to "ordered". Further, in a case where the job information (for example, the image quality request) includes a parameter (document proofreading option) indicating that correction and proofreading are performed by a specialized designer, the status transits from "ordered" to "Document is being corrected" when the job transits to correction and proofreading work by the specialized designer. When the printing process (including the preparation process) of the job in the printing machine 30 is actually started, the status transitions from "ordered" or "Document is being corrected" to "printing". When the printing process in the printing machine 30 is completed and the delivery work by a delivery company is started, the status document being corrected transitions from "printing" to "in delivery".

The job information accepting unit 62, the job execution determining unit 63, the determination result processing unit 64, the schedule generating unit 65, the job information registering unit 66, the prediction parameter correcting unit 67, the job information distributing unit 68, the job state notification unit 69, the company evaluation calculating unit 69a, the device information receiving unit 69b, and the billing information notification unit 69c described above are implemented, for example, by executing programs by the CPU 501 illustrated in FIG. 2. Some or all of these functional units may be implemented by an integrated circuit(s) such as an FPGA or an ASIC, instead of a program(s) that is software.

Each functional unit of the job management service 60 illustrated in FIG. 5 conceptually illustrates a function, and is not limited to such a configuration. For example, a plurality of functional units illustrated as independent functional units in the job management service 60 illustrated in FIG. 5 may be configured as one functional unit. On the other hand, in the job management service 60 illustrated in FIG. 5, a function of one functional unit may be divided into a plurality of functional units.

Device Management Service

As illustrated in FIG. 5, the device management service 70 of the cloud system 50 includes a communication unit 71, a device information registration unit 72, a device information providing unit 73, and a device information storage unit 79.

The communication unit 71 is a functional unit that transmits and receives various types of information to and from the printing machine 30 of the printing company 10.

For example, the communication unit 71 receives device information from the printing machine 30. When starting communication, the communication unit 71 uses a bidirectional communication mechanism (for example, WebSocket or Message Queuing Telemetry Transport (MQTT)). The communication unit 71 is implemented, for example, by executing a program by the network I/F 509 and the CPU 501 illustrated in FIG. 2.

The device information registration unit 72 is a functional unit that registers device information received via the communication unit 71 in the device information storage unit 79. An example of device information registered in the device information storage unit 79 is illustrated in Table 2 including Table 2-1 and Table 2-2 below.

TABLE 2-1

| Device ID | Configuration | Settings | Device State | Sheet Remaining Amount | Ink |
|---|---|---|---|---|---|
| K001 | Color: M sheets/minute Monochrome: N sheets/minute | Roll A-01 | In operation | N [m] | Color ink |
| K002 | Color: M sheets/minute Monochrome: N sheets/minute | Roll B-03 | Idle state | N [m] | Special ink |

TABLE 2-2

| Device ID | Ink Remaining Amount | Job State (schedule information) | Statistical Information | Printing Company ID |
|---|---|---|---|---|
| K001 | V [l] | 20xx/MM/DD hh:mm . . . | Operation rate: XX Preparation Efficiency: XX . . . | A |
| K002 | V [l] | 20xx/MM/DD hh:mm . . . | Operation rate: XX Preparation Efficiency: XX . . . | B |

The device information providing unit 73 is a functional unit that provides the job management service 60 with the device information registered in the device information storage unit 79. It is desirable that the device information providing unit 73 provides device information without delay when new device information is registered. Alternatively, the device information providing unit 73 may provide device information in response to a request from the device information receiving unit 69b of the job management service 60, or may provide device information periodically or at a timing when the load is small The device information storage unit 79 is a functional unit that stores device information as illustrated in Table 2 described above. The device information storage unit 79 is implemented by at least one of the RAM 503 or the HD 504 illustrated in FIG. 2. As illustrated in Table 2, the device information is information including, for example, a device ID, a configuration, a setting, a device state, a sheet remaining amount, ink, an ink remaining amount, a job state, and statistical information. The device ID is identification information for uniquely identifying the printing machine 30. The configuration is information relating to the functions of the printing machine 30, and includes, for example, whether color printing and monochrome printing are possible, the printing speed when possible, and the like. The settings include the size, type, and grade of the sheet of paper set in the printing machine 30. The device state represents the current state of the printing machine 30, such as operating, stopped, or malfunctioning. The sheet remaining amount is a remaining amount of sheet of paper. The ink is a type of ink mounted, such as color ink, transparent ink, fluorescent ink, or metallic ink. The ink remaining amount is a remaining amount of ink. The job status is information related to a job input to the printing machine 30, and includes, for example, schedule information. As described above, the statistical information indicates an operation rate of the printing machine 30, a maintenance state indicating whether inspection, cleaning, component replacement, and the like are performed as planned, the efficiency of print preparation for each job (for example, information on whether the print preparation is not too long compared to the printing time), and the like.

The device information registration unit 72 and the device information providing unit 73 described above are implemented by, for example, programs executed by the CPU 501 illustrated in FIG. 2. Some or all of these functional units may be implemented by an integrated circuit(s) such as an FPGA or an ASIC, instead of a program(s) that is software.

Each functional unit of the device management service 70 illustrated in FIG. 5 conceptually illustrates a function, and is not limited to such a configuration. For example, a plurality of functional units illustrated as independent functional units in the device management service 70 illustrated in FIG. 5 may be configured as one functional unit. On the other hand, in the device management service 70 illustrated in FIG. 5, a function of one functional unit may be divided into a plurality of functional units.

Billing Service

The billing service 80 of the cloud system 50 includes a billing processing unit 81 and a billing information storage unit 89.

The billing processing unit 81 is a functional unit that registers withdrawal information from the user (customer) and deposit information to each printing company 10 in the billing information storage unit 89, and requests transfer processing to the bank system corresponding to the bank accounts of the user (customer) and each printing company 10 based on those information. The bank system performs a transfer process between bank accounts on the due date.

The billing information storage unit 89 is a functional unit that stores withdrawal information and deposit information. The billing information storage unit 89 is implemented by at least one of the RAM 503 or the HD 504 illustrated in FIG. 3.

The above-described billing processing unit 81 is implemented, for example, by executing a program by the CPU 501 illustrated in FIG. 2. Note that the billing processing unit 81 may be implemented by an integrated circuit such as an FPGA or an ASIC instead of a program that is software.

Note that each functional unit of the billing service 80 illustrated in FIG. 5 conceptually illustrates a function, and is not limited to such a configuration. For example, a plurality of functional units illustrated as independent functional units in the billing service 80 illustrated in FIG. 5 may be configured as one functional unit. On the other hand, in the billing service 80 illustrated in FIG. 5, the functions of one functional unit may be divided into a plurality of functional units.

Data Model

Figure 16:
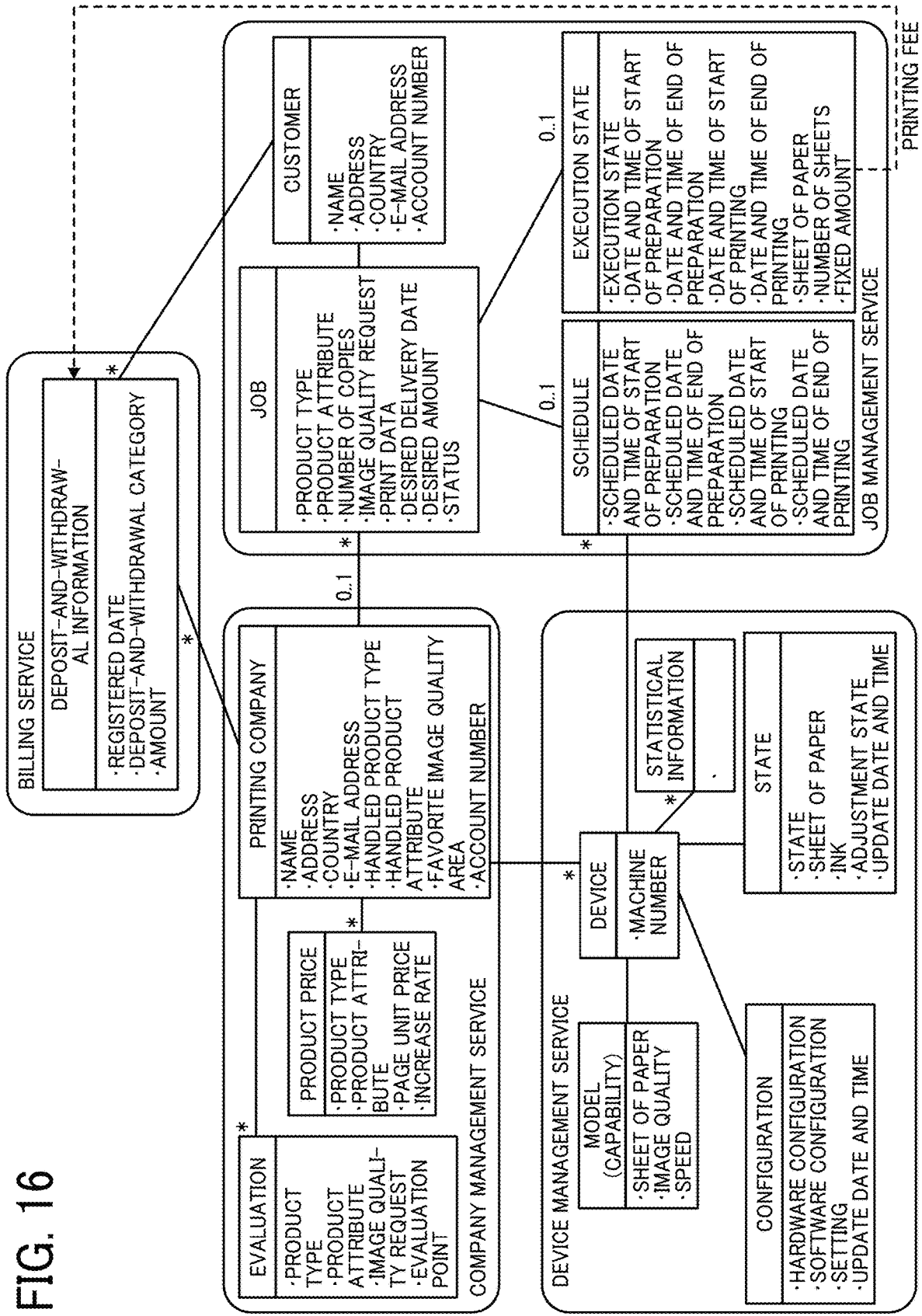
FIG. 16 is a diagram illustrating an example of a data model used in a device system according to an embodiment of the present disclosure.

FIG. 16 is a diagram illustrating a data model used in the device system according to an embodiment of the present disclosure. The data model used in the device system 100 according to the present embodiment is described below with reference to FIG. 16.

Billing Service

The billing service 80 has the following deposit-and-withdrawal information (withdrawal information and deposit information stored in the billing information storage unit 89).

Registration date

Deposit/withdrawal category

Amount

The deposit-and-withdrawal information is generated when a job registered from the information terminal 40 is distributed (or executed) to any of the printing companies 10. The deposit/withdrawal classification of a providing source is withdrawal, and the deposit/withdrawal classification of a providing destination is deposit.

Company Management Service

The company management service 90 has the following information about the printing company 10 (information stored in the company information storage unit 99).

Name

Address

Country

E-mail address

Product type handled

Product attribute handled

Image quality area of specialty

Account number (bank account)

The company management service 90 also has the following information related to product price (information stored in the company information storage unit 99).

Product type

Product attribute

Page unit price

Increase rate

The company management service 90 further has the following information related to evaluation of the printing company 10 (information stored in the company information storage unit 99).

Product type

Product attribute

Image quality request

Evaluation point (corresponding to the above-described user evaluation value)

Device Management Service

As described above, the printing machine 30 transmits the device information to the device management service 70 periodically or at a timing when the device information changes. The device management service 70 includes the following information related to model (information stored in the device information storage unit 79).

Sheet of paper

Image quality

Speed

The device management service 70 also has the following information related to the printing machine 30 (information stored in the device information storage unit 79).

Machine number

The device management service 70 further includes the following information related to the configuration (information stored in the device information storage unit 79).

Hardware Configuration
Software configuration
Settings
Update date and time

The device management service 70 further includes the following information related to state (information stored in the device information storage unit 79).

State (standby, ready, printing, stopped, error, etc.)
Sheet of paper (sheet type, remaining amount, etc.)
Ink (ink type, remaining amount, etc.)
Adjustment state (alignment, color tone, etc.)
Update date and time The device management service 70 also includes the statistical information described above (information stored in the device information storage unit 79).

Job Management Service

The job management service 60 includes the following information related to job (information stored in the job information storing unit 69*d*).

Product type
Product attribute
Number of copies
Image quality request
Print data
Desired delivery date
Desired amount
Status The desired amount (price) may be set, for example, as a customer request when the sales representative provides a job to another printing company 10, or as a request when the customer registers a job.

The job management service 60 further has the following information related to schedule (information stored in the job information storing unit 69*d*).

Scheduled date and time of start of preparation
Scheduled date and time of end of preparation
Scheduled date and time of start of printing
Scheduled date and time of end of printing The job management service 60 also has the following information related to execution results (information transmitted in the job execution completion notification).

Execution state
Date and time of start of preparation
Date and time of end of preparation
Scheduled date and time of start of printing
Scheduled date and time of end of printing
Sheet of paper
Number of sheets
Fixed amount The job execution completion notification is generated when the execution of the job is completed.

The job management service 60 further has the following information related to customers (information stored in the customer information storing unit 69*e*).

Name
Address
Country
E-mail address
Account number (bank account)

Overall process of Device System

Figure 17:
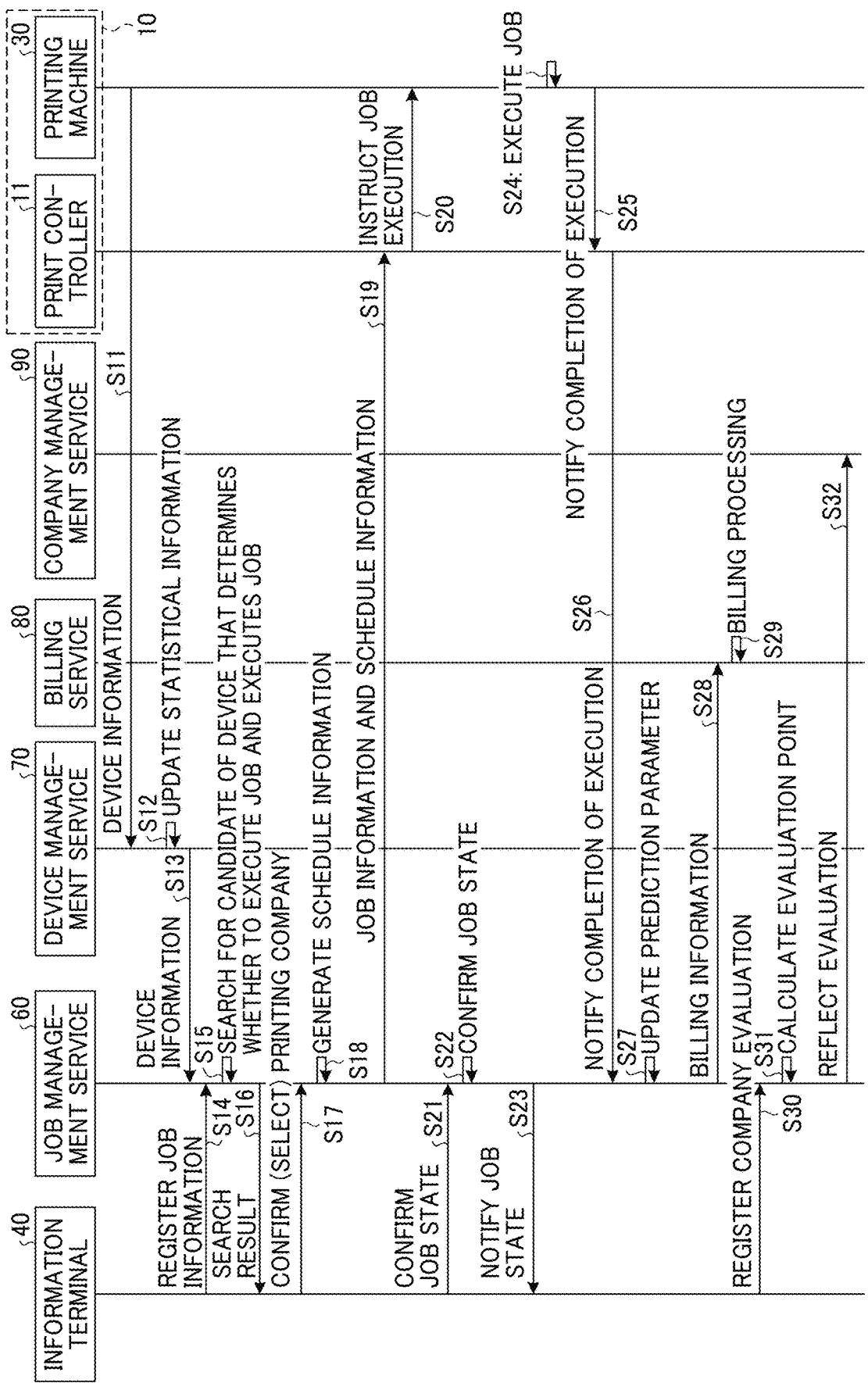
FIG. 17 is a sequence diagram illustrating an overall processing flow of a device system according to an embodiment of the present disclosure.
Figure 18:
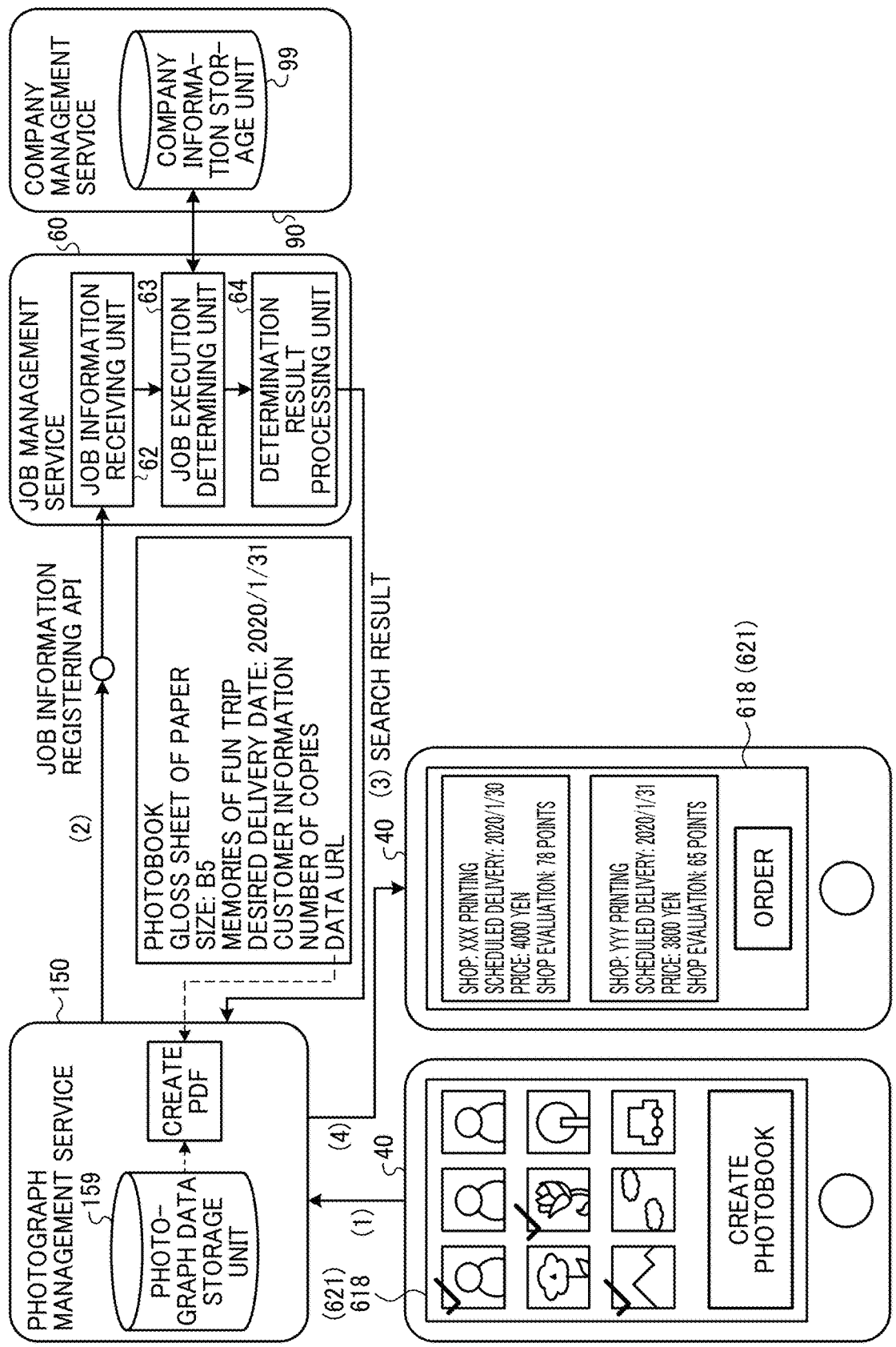
FIG. 18 is a diagram illustrating a specific operation of ordering a photo book.
Figure 19:
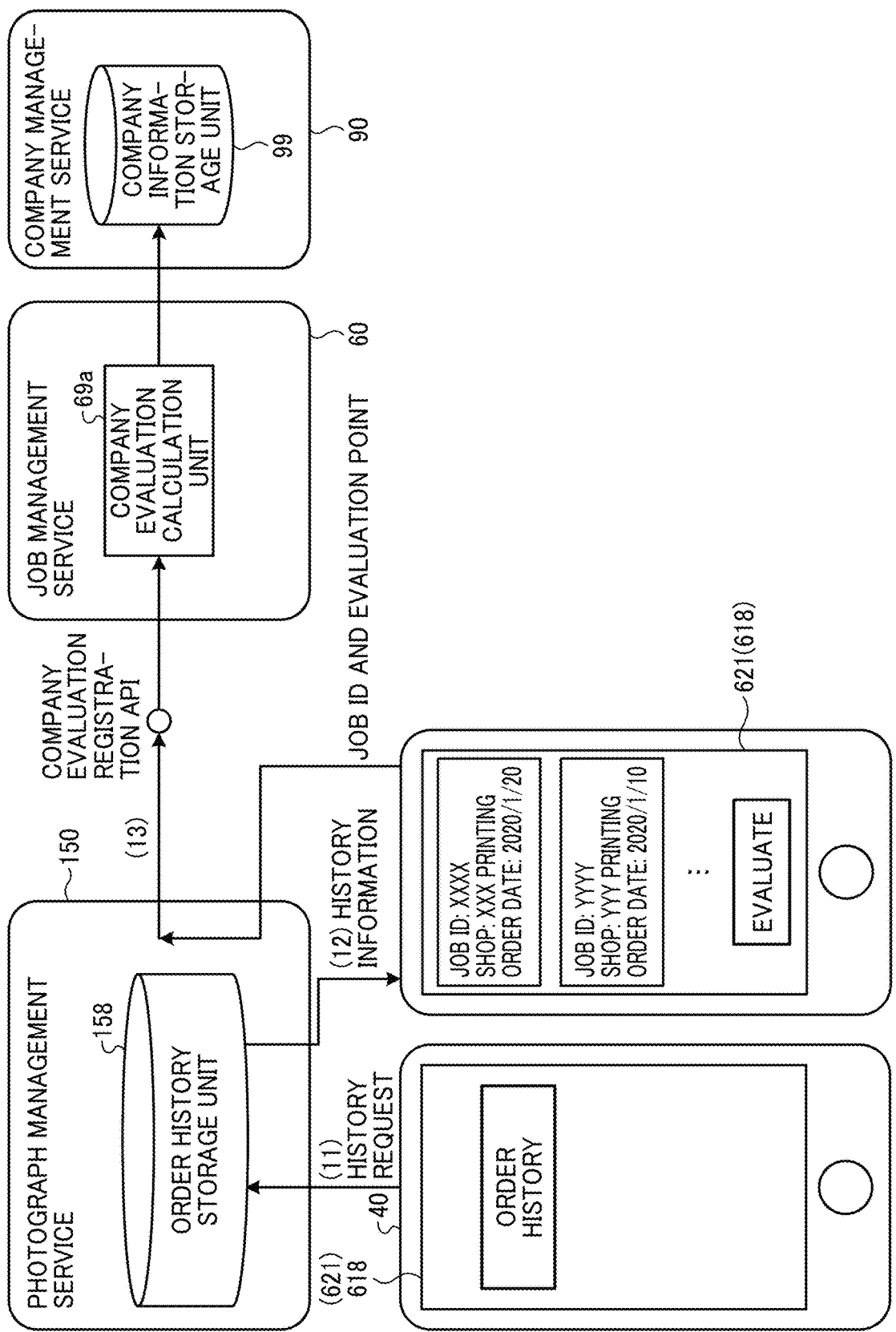
FIG. 19 is a diagram illustrating a specific operation of performing trader evaluation after ordering.

FIG. 17 is a sequence diagram illustrating an overall process of the device system according to an embodiment of the present disclosure. FIG. 18 is a diagram illustrating a specific operation of ordering a photo book. FIG. 19 is a diagram illustrating a specific operation of performing company evaluation after ordering. The overall process of the device system 100 according to the present embodiment is described below with reference to FIGS. 17 to 19. In FIGS. 18 and 19, assuming that a "photograph management application" is executed as an application executed in the information terminal 40, a specific operation in a case where a print service provided by the cloud system 50 is used from the "photograph management application" is described with reference to the overall process of the device system 100 illustrated in FIG. 17. In addition, in FIGS. 18 and 19, a photograph management service 150 exists in an external cloud or the like in order to complement the function of the "photograph management application". However, in some embodiments, the photograph management service 150 may not be included, and the "photograph management application" may have the function of the photograph management service 150. As illustrated in FIGS. 18 and 19, the photograph management service 150 includes an order history storage unit 158 and a photograph data storage unit 159. The order history storage unit 158 stores history information of past orders in association with each user. The photograph data storage unit 159 stores print data (photograph data) that the user desires to print. Note that the print data stored in the photograph data storage unit 159 may be appropriately converted into portable document format (PDF) data and stored.

Step S11

The device information transmission unit 32 of the printing machine 30 of each printing company 10 (for example, the printing company 10*a* or 10*b*) transmits device information related to the printing machine 30 to the device management service 70 via the communication unit 31. Here, as described above, the device information includes statistical information indicating an operation rate of the printing machine 30, a maintenance state indicating whether inspection, cleaning, component replacement, and the like are performed as planned, the efficiency of print preparation for each job (such as information on whether print preparation is not too long compared to a printing time), and the like.

Step S12

The device information registration unit 72 of the device management service 70 registers the device information received via the communication unit 71 in the device information storage unit 79. Thus, the statistical information stored in the device information storage unit 79 is updated to the latest one.

Step S13

Next, the device information providing unit 73 of the device management service 70 provides the job management service 60 with the device information registered in the device information storage unit 79. The device information receiving unit 69*b* of the job management service 60 receives the device information from the device management service 70.

Step S14

In order to use the print service provided by the cloud system 50, the job information registration request unit 42 of the information terminal 40 transmits, to the job management service 60 via the communication unit 41, a request of the job information registration API for registering job information including various types of information such as print data for requesting printing, which is input via the input unit 47.

In the example illustrated in FIG. 18, in order to use the print service provided by the cloud system 50, the photograph management application of the information terminal 40 transmits a print request for photograph data selected via the input unit 47 (the touch screen 621) to the photograph management service 150 via the communication unit 41, as indicated by (1) illustrated in FIG. 18. In response to the print request from the information terminal 40, the photograph management service 150 extracts the photograph data indicated by the print request from the photograph data storage unit 159, and transmits a request of the job information registration API for registering job information including various information such as the photograph data to the job management service 60, as indicated by (2) illustrated in FIG. 18.

Step S15

The job information accepting unit 62 of the job management service 60 receives the request of the job information registration API transmitted from the information terminal 40 via the communication unit 61. The job execution determining unit 63 of the job management service 60 determines which printing company 10 is to execute the job received by the job information accepting unit 62 (or which printing machine 30 held by the printing company 10 is to perform print processing). For example, the job execution determining unit 63 predicts the state of the printing machine 30 at the start of the idle time from the current state of the printing machine 30 of each printing company 10 and the schedule information scheduled to execute the job, and determines whether the newly received job can be completed by the end of the idle time. In addition, the job execution determining unit 63 determines the printing company 10 that executes the job in consideration of characteristic information indicating the characteristics of the printing company 10 such as the product type and product attribute of each printing company 10 acquired from the company information storage unit 99 of the company management service 90. Furthermore, the job execution determining unit 63 analyzes the job execution state of the print controller 11 of each printing company 10 based on statistical information included in the device information received by the device information receiving unit 69b, and determines the printing machine 30 of the printing company 10 that can be scheduled to be efficiently used. For example, the job execution determining unit 63 calculates a system evaluation value for each printing company (and each printing machine 30) based on the statistical information from the viewpoints that the operating rate of the printing machine 30 is high (idle period is short), maintenance of the printing machine 30 is performed in a planned manner, the time required for print preparation is short, the number of reruns of jobs is small, and scheduling can be performed so that the operating rate of each printing machine 30 as a whole is high. The job execution determining unit 63 determines which printing company 10 is to executed the job, based on the predicted state of the printing machine 30 and the calculated system evaluation value.

Step S16

The determination result processing unit 64 of the job management service 60 transmits, to the information terminal 40, the above-described response illustrated in FIG. 7 indicating that the job information accepting unit 62 has received the request of the job information API and the job execution determining unit 63 has determined the printing company 10 (and the printing machine 30) that executes the job information included in the request. When the job execution determining unit 63 determines a plurality of printing companies 10 or a plurality of printing machines 30, the determination result processing unit 64 transmits, to the information terminal 40, a response indicating candidates for a plurality of printing companies 10 or a plurality of printing machines 30 that can execute the job as illustrated in FIG. 8. Here, assuming that a plurality of printing companies 10 are determined by the job execution determining unit 63, the determination result processing unit 64 transmits a response indicating candidates of a plurality of printing companies 10 that can execute the job, as illustrated in FIG. 8 described above, to the information terminal 40 as a search result. The display control unit 46 of the information terminal 40 causes the display 618 to display a list of candidates of a plurality of printing companies 10 that can execute the job indicated by the response received from the job management service 60. For example, the display control unit 46 also displays the list including the evaluation value of each printing company 10 included in the response. Accordingly, the user can examine information (for example, evaluation values or the like) related to the printing company 10 and the printing machine 30 to select a desired printing company 10.

In the example illustrated in FIG. 18, the determination result processing unit 64 transmits a response indicating candidates of a plurality of printing companies 10 that can execute the job (printing out photo data) as illustrated in FIG. 8 described above to the information terminal 40 as a search result via the photograph management service 150, as indicated by (3) illustrated in FIG. 13. The photograph management application of the information terminal 40 causes the display 618 to display a list of candidates of the plurality of printing companies 10 that can execute the job indicated by the response received from the job management service 60, as indicated by (4) illustrated in FIG. 13. In the example illustrated in FIG. 18, "XXX printing" and "YYY printing" are displayed as candidates on the display 618.

Step S17

When the communication unit 41 receives a response to the job information registration API illustrated in FIG. 8 (in other words, a response indicating candidates of a plurality of printing companies 10 that can executed the job), the execution destination determination unit 43 notifies the job management service 60 of a request for the confirmation notification API for notifying confirmation of a job execution request for the printing company 10 selected by an operation on the input unit 47 from among the candidates of the printing companies 10 indicated by the response, for example, as illustrated in FIG. 11. In a case where the determination result processing unit 64 of the job management service 60 receives a request of the confirmation notification API from the information terminal 40 via the communication unit 61, the determination result processing unit 64 transmits a response to the request to the information terminal 40 via the communication unit 61. Specifically, when receiving the request of the confirmation notification API, the determination result processing unit 64 confirms that the printing company 10 (or the printing machine 30) indicated by the request is the printing company 10 (or the printing machine 30) that executes the job, sets the parameter "status" to "ordered" in the response, and transmits the response to the information terminal 40.

Step S18

The schedule generating unit 65 of the information terminal 40 generates schedule information when the determination result processing unit 64 determines the printing company 10 that executes the job information. The job information registering unit 66 of the information terminal 40 sets information included in the request of the job information registration API received by the job information accepting unit 62 as job information, includes a status of "order completed" and schedule information generated by the schedule generating unit 65 in the job information, and stores the job information in the job information storing unit 69d.

Step S19

The job information distributing unit 68 of the job management service 60 transmits (delivers) job information including schedule information to the print controller 11 of the printing company 10 determined by the determination result processing unit 64 via the communication unit 61. The communication unit 31 of the print controller 11 of the printing company 10 receives the job information including the schedule information.

Step S20

The job execution instruction unit 18 of the print controller 11 of the printing company 10 instructs the printing machine 30 to execute the job in accordance with the schedule information received by the communication unit 14.

Step S21

After registering a job in the cloud system 50, the user of the information terminal 40 may want to check the progress of the job. In such a case, the job state request unit 44 of the information terminal 40 transmits a request of the job state notification API for inquiring about the progress state of the job to the job management service 60 via the communication unit 41 in accordance with an operation input to the input unit 47 after the execution destination determination unit 43 determines the printing company 10 that executes the job.

Step S22

When the communication unit 61 receives the request of the job state notification API from the information terminal 40, the job state notification unit 69 of the job management service 60 refers to the job information storing unit 69d, extracts the status and details of the job indicated by the request, and checks the current job state.

Step S23

The job state notification unit 69 is a functional unit that includes the status and the details in a response to the request and transmits the response to the information terminal 40 via the communication unit 61. Specifically, as in the example illustrated in FIG. 14 described above, the job state notification unit 69 transmits a response including "status" and "detail" to the information terminal 40.

Step S24

The job execution unit 33 of the printing machine 30 of the printing company 10 executes the job in response to a job execution instruction from the job execution instruction unit 18. For example, the job execution unit 33 causes the printer section 932 to print out the print data included in the job information on a recording medium such as a sheet of paper.

Steps S25 and S26

When the execution of the job is completed, the job execution unit 33 transmits a job execution completion notification to the print controller 11. The communication unit 14 of the print controller 11 transmits the job execution completion notification received from the printing machine 30 to the job management service 60. The communication unit 61 of the job management service 60 receives the job execution completion notification.

Step S27

The communication unit 61 of the job management service 60 stores the received job completion notification in the job information storing unit 69d, and the prediction parameter correcting unit 67 corrects the prediction parameters. The prediction parameters may be corrected, for example, periodically.

Steps S28 and S29

The billing information notification unit 69c of the job management service 60 notifies the billing service 80 of withdrawal information from the user (customer) of the information terminal 40 that registered the job and deposit information to the printing company 10 to which the job was distributed. The billing processing unit 81 of the billing service 80 registers withdrawal information from the user (customer) and deposit information to each printing company 10 in the billing information storage unit 89, and requests transfer processing to the bank system corresponding to the bank accounts of the user (customer) and each printing company 10 based on those information.

Step S30

After enjoying the print service of the cloud system 50, the user of the information terminal 40 may want to register an evaluation for the printing company 10 that has received the request for the job related to the print service, from the viewpoints of the finished state of a printed matter, compliance with a desired delivery date, cost performance, and the like. The company evaluation registration request unit 45 of the information terminal 40 transmits, to the job management service 60 via the communication unit 41, a request of the API for requesting registration of an evaluation value for the printing company 10 that has been requested to execute a job (printing of print data) in the past, in accordance with an operation input to the input unit 47. The request includes, as an input parameter, an evaluation value ("evaluation") for the printing company 10 entered by the user.

In the example illustrated in FIG. 19, the photograph management application of the information terminal 40 transmits a history request for requesting a history of past orders to the photograph management service 150 in accordance with an operation on the input unit 47 (or the touch screen 621), as indicated by (11) illustrated in FIG. 19. Next, upon receiving the history request, the photograph management service 150 extracts history information of past orders from the order history storage unit 158 and transmits the extracted history information to the information terminal 40, as indicated by (12) illustrated in FIG. 19. The photograph management application displays a list of past orders (jobs) indicated by the received history information on the touch screen 621. When the user selects the order history of the printing company 10 to be evaluated, the company evaluation registration request unit 45 of the information terminal 40 transmits a request of an API (company evaluation registration API) including the job ID and the evaluation point as input parameters to the job management service 60 via the photograph management service 150, as indicated by (13) illustrated in FIG. 19.

Step S31

When the communication unit 61 receives an API request for registration of an evaluation point from the information terminal 40, the company evaluation calculating unit 69a of the job management service 60 refers to the company information storage unit 99 of the company management service 90, extracts the current evaluation value of the printing company 10 that executed the job indicated by the request in the past, and calculates a new evaluation value (user evaluation value) based on the evaluation value and the evaluation value included in the request.

Step S32

The company evaluation calculating unit 69a stores (reflects) the calculated user evaluation value as a new evaluation value of the printing company 10 in the company information storage unit 99 of the company management service 90 in association with the printing company 10. Then, in response to the request received by the communication unit 61, the company evaluation calculating unit 69a transmits a response indicating that the registration of the evaluation value has been accepted, to the information terminal 40 via the communication unit 61.

Job Execution Determination Process

Figure 20:
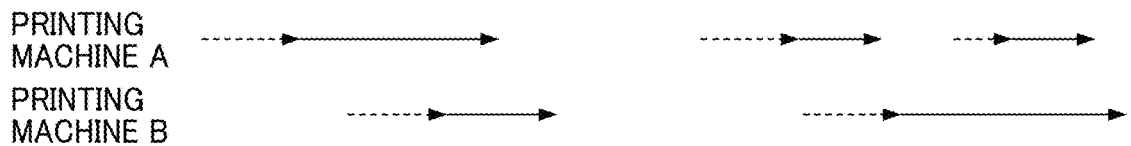
FIG. 20 is a diagram illustrating print preparation and printing of a job by arrow lines.
Figure 21:
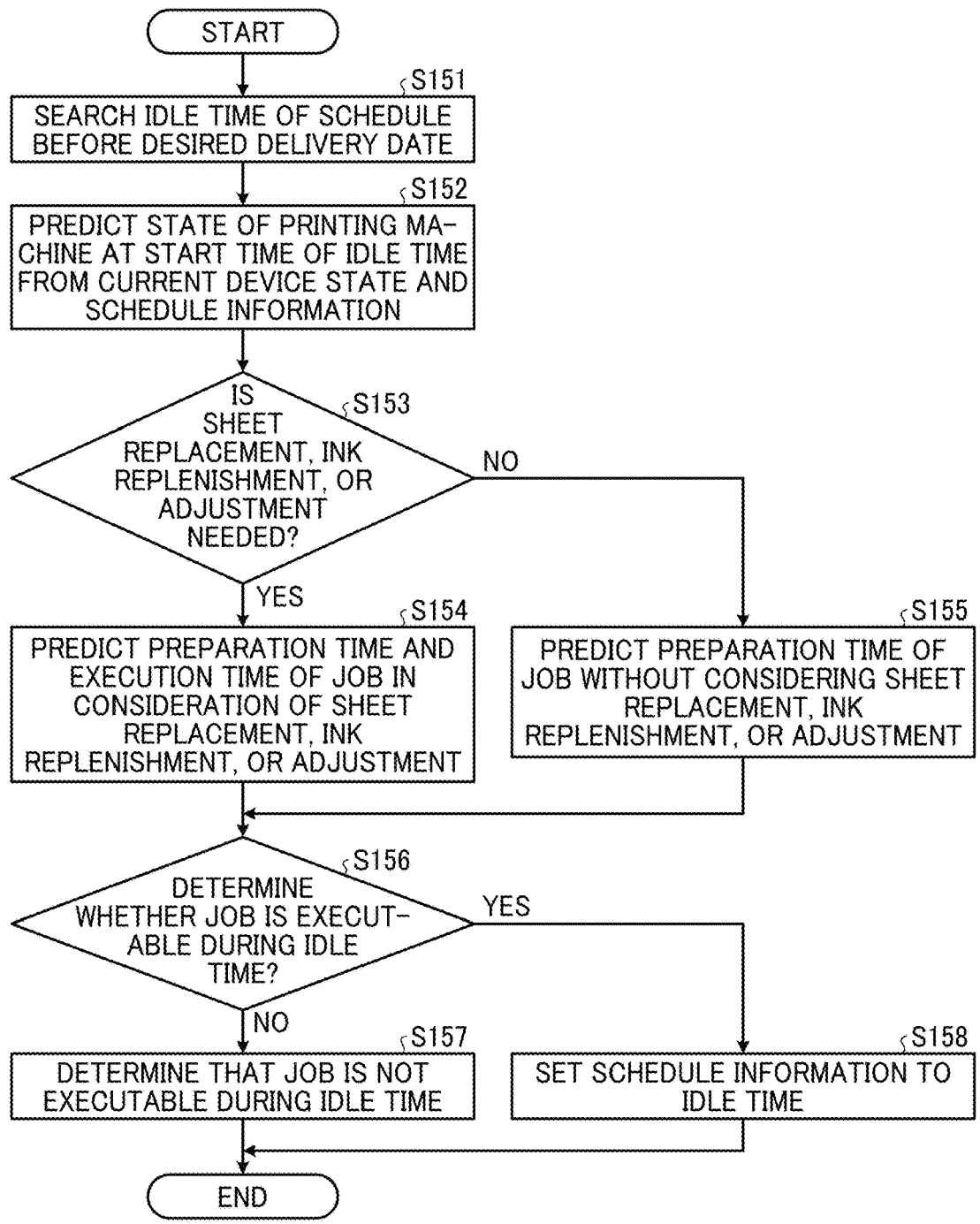
FIG. 21 is a flowchart illustrating a job execution determination process according to an embodiment of the present disclosure.

FIG. 20 is a diagram illustrating print preparation and printing of a job indicated by arrow lines. FIG. 21 is a flowchart illustrating a job execution determination process according to an embodiment of the present disclosure. With reference to FIGS. 20 and 21, the job execution determination process in step S15 of FIG. 17 is described in detail.

FIG. 20 illustrates the print preparation and print schedule information for two printing machines 30 (printing machines A and B). A dotted line indicates print preparation and a solid line indicates printing. A portion without a dotted line or a solid line is an idle time. The length of arrow represents time.

Next, with reference to FIG. 21, a specific procedure of the job execution determination process in step S15 of FIG. 17 described above is described.

Step S151

The job execution determining unit 63 searches for an idle time in the schedule information up to the desired delivery date for the printing machine 30 (all printing machines if there are a plurality of printing machines 30) of the printing company 10 that is to be determined with respect to whether to execute the job. Then, the process proceeds to step S152.

Step S152 The job execution determining unit 63 predicts the state of the printing machine 30 at the start time of the idle time from the current device state and the schedule information up to the idle time of interest for the printing machine 30 to be determined. The state of the printing machine 30 is, for example, a set sheet type, sheet remaining amount, ink, ink remaining amount, or adjustment state. A prediction method is described below. The reason why the state of the printing machine 30 at the start time of the idle time is predicted as described above is that operations necessary before the start of printing include setting of sheet of paper, replacement of roll sheets of paper, ink replenishment, head cleaning, adjustment (alignment, color tone, etc.), test printing, and the like, and in commercial printing, the time required for preparation is long. Then, the process proceeds to step S153.

Step S153

The job execution determining unit 63 determines the necessity of sheet replacement, ink replenishment, or adjustment as preparation for job execution from the predicted state of the printing machine 30 and new job information. The new job information also determines the sheet type to be set, the required number of sheets, (the type of) ink, the amount of ink, and the like. When such predicted states are different from the states of the printing machine 30 set for executing new job information, the job execution determining unit 63 determines that replacement, adjustment, or replenishment is necessary. Note that it is desirable to determine the necessity of head cleaning. The job execution determining unit 63 also determines the prediction of the state of the printing machine 30 and the necessity of head cleaning with reference to the past history. When sheet replacement, ink replenishment, or adjustment is necessary (Yes in step S153), the process proceeds to step S154. When sheet replacement, ink replenishment, or adjustment is unnecessary (No in step S153), the process proceeds to step S155.

Step S154

When sheet replacement, ink replenishment, or adjustment is necessary, the job execution determining unit 63 predicts a preparation time and an execution time of the job in consideration of sheet replacement, ink replenishment, or adjustment. The time required for sheet replacement, ink replenishment, or adjustment is estimated in advance for each type of sheet of paper and each content of adjustment. Then, the process proceeds to step S156.

Step S155

When sheet replacement, ink replenishment, or adjustment is unnecessary, the job execution determining unit 63 predicts the preparation time of the job without considering the sheet replacement, the ink replenishment, or the adjustment. In this case, the job execution determining unit 63 sets, for example, a predetermined time (a minimum time required to start the operation of the printing machine 30) as the preparation time of the job. Then, the process proceeds to step S156.

Step S156

Next, the job execution determining unit 63 determines whether the job can be executed during the idle time. That is, when the idle time is longer than the sum of the preparation time and the execution time, the job execution determining unit 63 determines that the job can be executed in the idle time. However, when the predicted execution end time exceeds the desired delivery date, the job execution determining unit 63 determines that the job cannot be executed during the idle time. When the predicted execution end time does not exceed the desired delivery date but the next schedule information is registered after the idle time, the job execution determining unit 63 corrects the prediction of the preparation time of the job information set after the end of the new job. The prediction is performed in the same manner as in step S152. The job execution determining unit 63 also determines that the job cannot be executed in the idle time when the preparation start time of the next job information is advanced to meet the desired delivery date due to a change in the preparation time but the predicted execution end time of the new job exceeds the advanced preparation start time of the next job information. If the job cannot be executed during the idle time (No in step S156), the process proceeds to step S157. If the job can be executed (Yes in step S156), the process proceeds to step S158.

Step S157

When the job cannot be executed in the idle time, the job execution determining unit 63 determines that the job cannot be executed in the idle time.

Step S158

When the job can be executed in the idle time, the job execution determining unit 63 sets the schedule information to the idle time of the printing machine 30.

As described above, the job execution determining unit 63 determines whether a job can be executed for each idle time. When there are a plurality of executable idle times, the job execution determining unit 63 selects an idle time for executing the job, for example, as follows.

The job execution determining unit 63 selects an idle time in which the preparation time of the next schedule information is shorter.

When the gap time of each idle time with the next schedule information is equal to or less than a threshold value, the job execution determining unit 63 selects an idle time having a shorter gap time.

If the gap time of each idle time with the next schedule information is greater than the threshold value, the job execution determining unit 63 selects an idle time having a longer gap time.

The job execution determining unit 63 selects an idle time of the printing machine 30 having the highest system evaluation value calculated based on the statistical information, from among the printing machines 30 of the printing company 10 having the plurality of executable idle times.

These selection methods can reduce the preparation time such as sheet replacement, reduce an idle time in which no job is allocated, and allocate another job to an idle time, thus enhancing the overall productivity.

Device State Prediction Process

Figure 22:
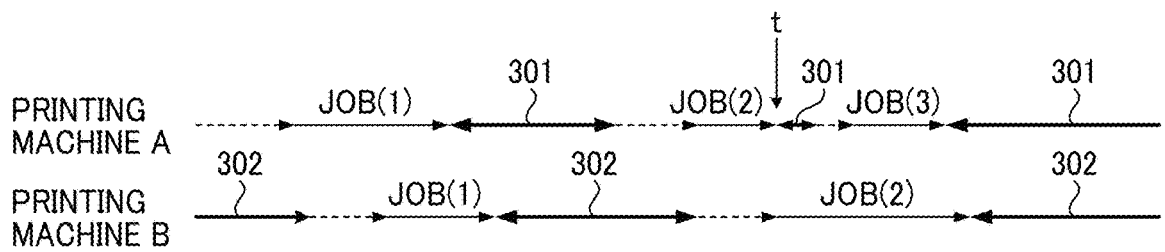
FIG. 22 is a diagram illustrating prediction of a device state at a start time of an idle time according to an embodiment of the present disclosure.
Figure 23:
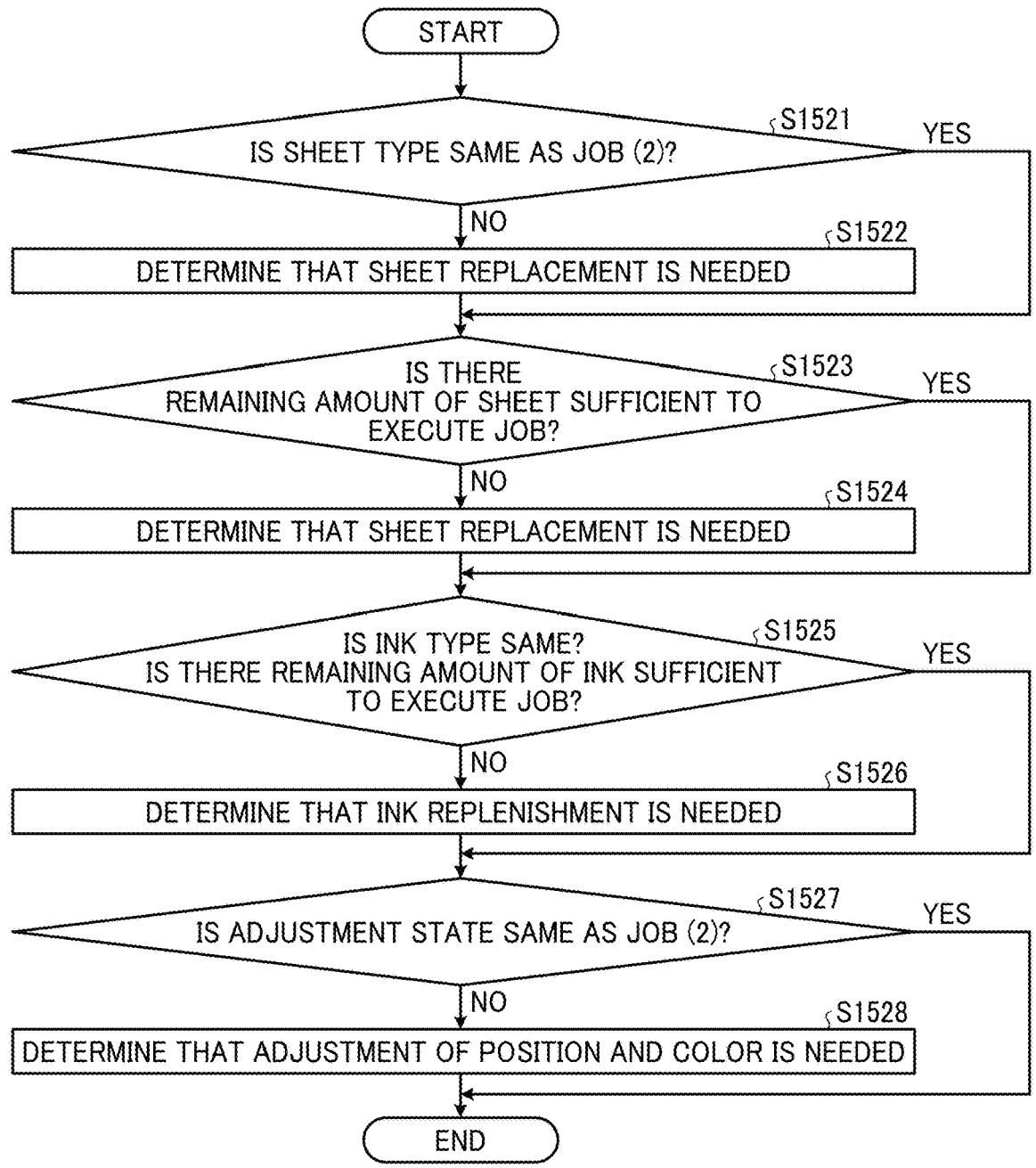
FIG. 23 is a flowchart illustrating a procedure of a prediction process of a device state according to an embodiment of the present disclosure.

FIG. 22 is a diagram illustrating the prediction of the device state at the start time of the idle time. FIG. 23 is a flowchart illustrating a device state prediction process according to an embodiment of the present disclosure. With reference to FIGS. 22 and 23, the device state prediction process in step S152 of FIG. 21 is described in detail.

FIG. 22 illustrates an example in which jobs (1) to (3) are set in a printing machine A and jobs (1) and (2) are set in a printing machine B. A thick double arrow 301 between jobs indicates job information added to an idle time in the printing machine A. A double-headed arrow 302 indicates job information added to an idle time in the printing machine B. When it is determined that a job can be executed in an idle time, a new job is set to the idle time. Hereinafter, with reference to FIG. 23, a procedure is described of determining whether a new job can be set in an idle time between the job (2) and the job (3) scheduled to be executed by the printing machine A. As described above in step S152 of FIG. 21, the job execution determining unit 16 predicts the state of the printing machine 30 at a start time t of an idle time at which the job (2) immediately before the idle time ends.

Step S1521

First, the job execution determining unit 63 determines whether the sheet type of the new job is the same as the sheet type of the job (2). If they are different (No in step S1521), the process proceeds to step S1522. If they are the same (Yes in step S1521), the process proceeds to step S1523.

Step S1522

When the sheet type of the new job is different from the sheet type of the job (2), the job execution determining unit 63 determines that the sheet needs to be replaced. Then, the process proceeds to step S1523.

Step S1523

Next, the job execution determining unit 63 determines whether there is a sheet remaining amount sufficient to execute the job. In a case where the job (1), the job (2), and the new job are of the same sheet type, the job execution determining unit 63 subtracts the usage amounts of the job (1) and the job (2) from the current remaining sheet amount in the device information. When the job (1) and the job (2) have different sheet types and the new job has the same sheet type as the job (2), the job execution determining unit 63 subtracts the usage amount of the job (2) from the remaining amount (which is not necessarily the remaining amount of a new sheet roll) of the sheet type used by the job (2). When it is predicted that the sheet will be used up and replaced during the execution of the job (1) and the job (2) or the execution of the job (2), the job execution determining unit 63 subtracts the subsequent usage amount from the sheet amount after the replacement. In a case where the sheet is different between the job (2) and the new job, the sheet needs to be replaced. For this reason, the job execution determining unit 63 acquires the remaining amount (which is not necessarily the remaining amount of a new sheet roll) of the sheet type used in the new job.

When there are a plurality of stocks of the same sheet, a roll having a larger remaining amount than that of a new job may be selected to reduce sheet replacement during execution of the new job. Further, in order to prevent a sheet from being discarded, a roll whose remaining amount is smaller than that of a new job may be selected to use up the sheet. The replacement policy may be changed by administrator settings.

As a result of comparing the sheet remaining amount at the completion of the job (2) or the sheet remaining amount of the replaced sheet type with the number of sheets necessary for the new job, when it is predicted that the sheet will be used up and replaced during the job (No in step S1523), the process proceeds to step S1524, and otherwise (Yes in step S1523), the process proceeds to step S1525.

Step S1524

As a result of comparing the sheet remaining amount at the completion of execution of the job (2) or the sheet remaining amount of the replaced sheet type with the number of sheets necessary for the new job, when it is predicted that the sheet will be used up and replaced during execution of the job, the job execution determining unit 63 determines that replacement with a new sheet roll is necessary. Then, the process proceeds to step S1525.

Step S1525

Next, the job execution determining unit 63 determines whether the ink type is the same as that of the job (2) and whether there is an ink remaining amount sufficient to execute the job. The concept is the same as that in the cases of the sheet type and the sheet remaining amount. However, the time required for replacement and replenishment of ink is shorter than that of sheet. When the ink type is different or when the ink type is the same and there is no ink remaining amount sufficient to execute the job (No in step S1525), the process proceeds to step S1526. When the ink type is the same and there is an ink remaining amount sufficient to execute the job (Yes in step S1525), the process proceeds to step S1527.

Step S1526

In a case where the ink type is different or when the ink type is the same and there is no ink remaining amount sufficient to execute the job, the job execution determining unit 63 determines that ink replenishment is necessary so that replenishment does not occur during the execution of the job. Then, the process proceeds to step S1527.

Step S1527

Next, the job execution determining unit 63 determines whether the adjustment state is the same as that of the job (2). The adjustment state refers to a formation position and a color development state of an image on a sheet. At the end of the job (2), the sheet and image quality requests are in the adjustment state in accordance with the sheet and image quality requests of the job (2). Therefore, since whether the adjustment state is the same as that of the new job is determined by the sheet and image quality requests of the new job, the job execution determining unit 63 determines whether both are the same. In a case where both are not the same (No in step S1527), the process proceeds to step S1528. In a case where both are the same (Yes in step S1527), the device state prediction process ends.

Step S1528

If both are not the same, the job execution determining unit 63 determines that the position and color need to be adjusted. Then, the device state prediction process ends.

As described above, the state of the printing machine 30 at the start time of the idle time can be predicted, and the preparation time can be calculated based on the predicted state of the printing machine 30 and the state of the printing machine 30 set based on the received job information.

Preparation Time and Execution Time

Figures 24, 25:
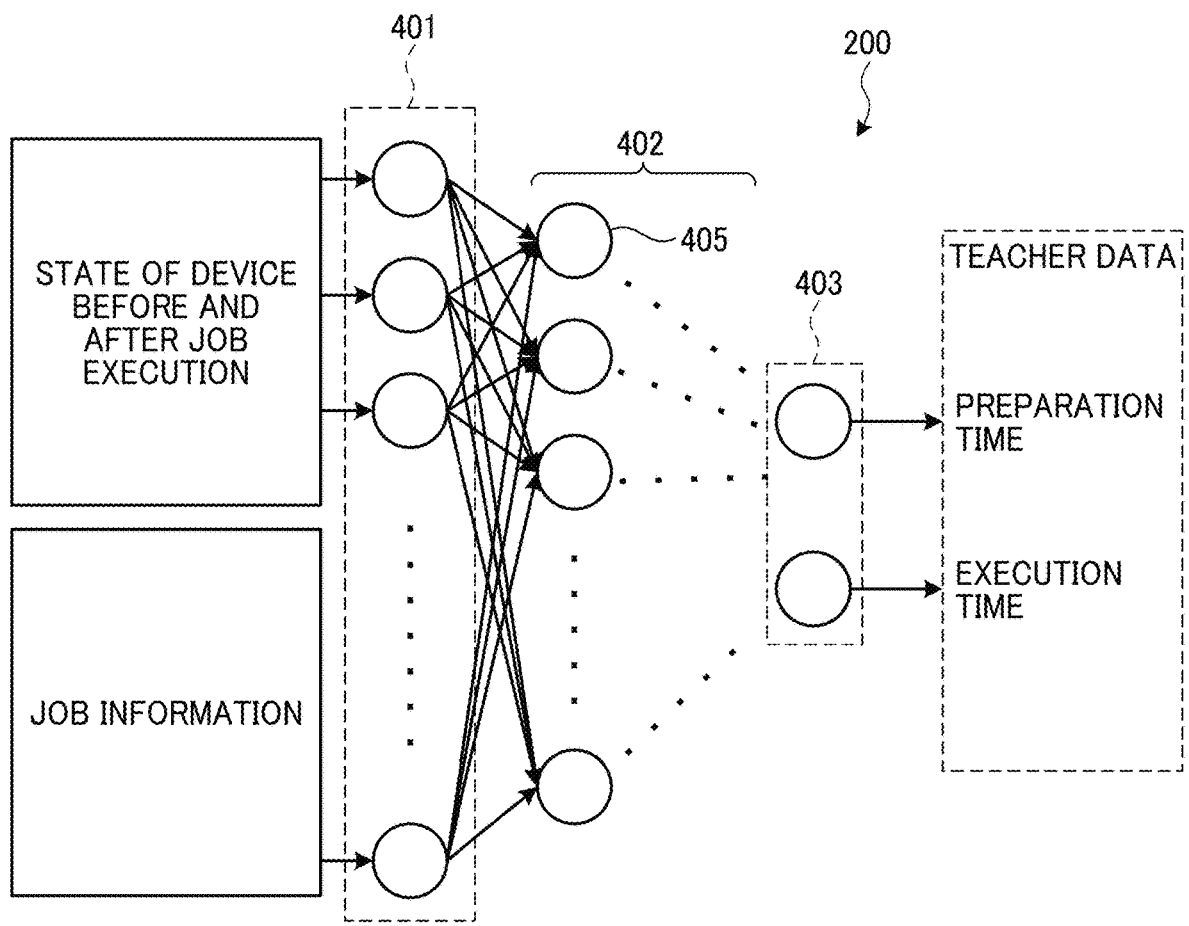
FIG. 24 is a diagram illustrating an operation of predicting a preparation time and an execution time.
FIG. 25 is a diagram illustrating a neural network used for machine learning according to an embodiment of the present disclosure.

FIG. 24 is a diagram illustrating an operation of predicting the preparation time and the execution time. The preparation time and the execution time are described with reference to FIG. 24.

The preparation time is a time required for preparation, and the execution time is a time required for execution of a job. As illustrated in FIG. 24, the preparation time can be represented by "$T_{PC}+T_{if}+T_{hc}+T_{ac}+T_{tp}$". That is, the preparation time is the sum of the time required for sheet replacement, the time required for ink replenishment, the time required for head cleaning, the time required for adjustment, and the time required for test printing. As described above, the sum of the time required for sheet replacement, ink replenishment, adjustment, and so forth necessary to obtain the state of the printing machine 30 based on the job information received by the job information accepting unit 62 is the preparation time.

Here, $T_{PC}$ is the time required for sheet replacement. If the sheet type is the same for the previous job and the new job, and a sufficient remaining amount remains, replacement is unnecessary and $T_{PC}$ is 0. $T_{if}$ is the time required for ink replenishment. If the ink type is the same as that of a new job and a sufficient remaining amount remains, replenishment is unnecessary and $T_{if}$ is 0. $T_{hc}$ is the time required for head cleaning. $T_{hc}$ is 0 when it can be determined from the past execution history that head cleaning is unnecessary. $T_{ac}$ is the time required for adjustment (alignment, color tone, or the like). $T_{ac}$ is 0 when it can be determined that a previous job and a job to be executed have the same sheet and image quality requests and adjustment is unnecessary from the past execution history. $T_{tp}$ is the time required for test printing.

The execution time can also be represented by "$T_{PC}+T_{if}+T_{hc}+T_{ac}+T_{pp}$". That is, the execution time is the sum of the time required for sheet replacement during execution of a job, the time required for ink replenishment, the time required for head cleaning, the time required for adjustment, and the printing time. Where $T_{PC}$, $T_{if}$, $T_{hc}$, and $T_{ac}$ are times when replacement occurs during execution of a job. In the execution time, not the test printing time $T_{tp}$ but the printing time $T_{pp}$ is predicted. The printing time $T_{pp}$ is calculated by "the number of pages per copy×the number of sheets in job information/printing speed".

Job Execution Completion Notification

The print controller 11 transmits a job execution completion notification to the job management service 60 when the execution of the job in the printing machine 30 is completed. The job execution completion notification includes, for example, a log (preparation time and execution time) of the executed job, an amount of money, and states of the printing machine 30 before and after the execution of the job.

The states of the printing machine 30 before and after the job execution include, for example, the sheet type of the previous job, the sheet type of the new job, the sheet remaining amount of the previous job, the number of sheets to be consumed by the new job, the ink type of the previous job, the ink type of the new job, the remaining ink amount of the previous job, the remaining ink amount of the new job, the adjustment state of the previous job, and the adjustment state of the new job.

The job management service 60 accumulates the states of the printing machine 30 before and after the job execution in association with the job execution completion notification and performs statistical processing or machine learning, thus enhancing the prediction accuracy of the preparation time and the execution time.

Machine learning is a technique for causing a computer to acquire human-like learning capability, and refers to a technique in which a computer autonomously generates an algorithm necessary for determination of data identification or the like from learning data acquired in advance, and applies the algorithm to new data to perform prediction. The learning method for machine learning may be any method of supervised learning, unsupervised learning, semi-supervised learning, reinforcement learning, and deep learning, and may be a learning method combining these learning methods, and the learning method for machine learning is not limited to any particular method.

FIG. 25 is a diagram illustrating a neural network used for machine learning according to an embodiment of the present disclosure. A neural network having a deep hierarchy is referred to as a deep neural network (DNN). A layer between an input layer 401 and an output layer 403 is referred to as an intermediate layer 402. The number of layers, the number of nodes 405, and the like in FIG. 25 are examples.

For example, the states of the printing machine 30 before and after execution of a job and job information are input to the input layer 401. For information that is not a numerical value such as the sheet type and the ink type of the job, numerical values corresponding to the sheet type and the ink type of the job are prepared and input. Alternatively, each of the sheet type and the ink type may be represented by one-hot vector. The number of nodes of the output layer 403 is two corresponding to the preparation time and the execution time.

Input data input to the input layer 401 is transmitted to the output layer 403 through the node 405 in a forward propagation manner. The nodes are connected by weights (parameters), and an activation function is set in each node 405. In the present embodiment, since the output of the nodes of the output layer 403 are brought close to the actual preparation time and execution time, this becomes a regression problem for predicting quantitative data. Thus, the activation function of a node of the output layer 403 may be an identity mapping that does not transform anything. A loss function for evaluating a difference between an output of each node of the output layer 403 and teacher data (preparation time and execution time) is known, and a square error is often used as a loss function in the case of a regression model. The loss evaluated by the loss function propagates through the neural network 200 in the reverse direction from the output layer 403 to the input layer 401, and the parameters (the weights connecting the nodes) of the neural network 200 are updated. Such a learning method is called an error back-propagation method.

Although the preparation time and the execution time are predicted in FIG. 25, the state change of the printing machine 30 can be predicted assuming that the teacher data of the output layer 403 is the state change of the printing machine 30. In this case, a number of nodes corresponding to the state of the printing machine 30 are prepared in the output layer 403, and the state of the printing machine 30 is associated with each node. The state of the printing machine 30 in this case is, for example, the sheet type, the ink, or the adjustment state, and the neural network 200 learns the parameters with "1" when there is a state change and "0" when there is no state change.

Note that although the neural network 200 is described with reference to FIG. 25, machine learning techniques include perceptron, deep learning, support vector machine, logistic regression, naive Bayes, decision tree, random forest, and the like, and are not limited to the techniques described in the present embodiment.

As described above, in the device system 100 according to the present embodiment, the job information accepting unit 62 receives job information requesting printout of print data from the information terminal 40, the job execution determining unit 63 determines one or more printing companies 10 having printing machines 30 that can execute the job information based on the states of the printing machines 30 and the contents of the job information, and the determination result processing unit 64 transmits the information of the one or more printing companies 10 determined by the job execution determining unit 63 to the information terminal 40 for display on the information terminal 40. As a result, the user can select a desired printing company 10 from a list of information relating to the printing companies 10, so that the user can grasp which printing company 10 prints the print data for which printing has been ordered.

The device information receiving unit 69*b* acquires statistical information, which is statistical information related to the operation and maintenance of each printing machine 30, from each printing machine 30 held by a plurality of printing companies 10, and the job execution determining unit 63 further determines one or more printing companies 10 holding printing machines 30 that can execute jobs among the plurality of printing companies 10 based on the statistical information. Such a configuration increases the possibility that a printing company 10 that performs well in terms of the operation and maintenance of the printing machine 30 is selected as the entity that executes the job. Accordingly, an incentive to improve the print quality of each printing company 10 acts, and the user can also be provided with a high-quality print service by improvement of the print quality of each printing company 10.

In the above-described embodiment, when at least one of the functional units of the information terminal 40, the cloud system 50, and the print controller 11 is implemented by executing a program, the program is incorporated in advance and provided in, for example, a ROM. In addition, in the above-described embodiment, the programs executed by the information terminal 40, the cloud system 50, and the print controller 11 may be recorded and provided in a computer-readable recording medium such as a compact disc read only memory (CD-ROM), a flexible disk (FD), a compact disc-recordable (CD-R), or a digital versatile disc (DVD) as an installable or executable file. In the above-described embodiment, the program executed by the information terminal 40, the cloud system 50, and the print controller 11 may be stored in a computer connected to a network such as the Internet and provided to be downloaded via the network. In the above-described embodiment, the program executed by the information terminal 40, the cloud system 50, and the print controller 11 may be provided or distributed via a network such as the Internet. In addition, in the above-described embodiment, the program executed by the information terminal 40, the cloud system 50, and the print controller 11 have a module configuration including at least one of the above-described functional units. As actual hardware, the CPU 501 (or the CPU 601) reads the program from the above-described storage device (for example, the ROM 502 or the HD 504, or the ROM 602 or the EEPROM 604) and executes the program, so that the above-described functional units are loaded and generated on the main storage device.

Although the present disclosure has been described based on the above-described embodiments, embodiments of the present disclosure are not limited to the content illustrated in the above-described embodiments. These points can be modified without departing from the gist of the present disclosure, and can be appropriately determined according to the application form.

The functions of the above-described embodiments may be implemented by one or a plurality of processing circuits. Here, the processing circuit or circuitry in the present specification includes a programmed processor to execute each function by software, such as a processor implemented by an electronic circuit, and devices, such as an application specific integrated circuit (ASIC), a digital signal processor (DSP), and a field programmable gate array (FPGA), and conventional circuit modules arranged to perform the recited functions.

The invention claimed is:

1. An information processing system, comprising processing circuitry configured to:
   accept a job requesting print output of print data from an information terminal;
   determine one or more printing companies having a printer that can execute the job, among a plurality of printing companies, based on a job schedule of the printer held by each one of the plurality of printing companies and a desired delivery date of the job; and
   transmit determined information to the information terminal.

2. The information processing system according to claim 1, wherein the processing circuitry is configured to:
   confirm a printing company selected by the information terminal, among the one or more printing companies determined, as a printing company that executes the job; and
   distribute the job to a print controller of the printing company confirmed.

3. The information processing system according to claim 1, wherein the processing circuitry is configured to:
   acquire statistical information from each printer held by each of the plurality of printing companies, the statistical information being related to operation and maintenance of each printer; and
   determine the one or more printing companies having the printer that can execute the job, among the plurality of printers, based on the statistical information acquired.

4. The information processing system according to claim 3,
   wherein the statistical information includes any one of an operation rate of a printer held by each of the plurality of printing companies, a maintenance status indicating whether maintenance has been performed on the printer held by each of the plurality of printing companies, and a preparation efficiency indicating a length of preparation time with respect to a printing time of a job executed on the printer held by each of the plurality of printing companies.

5. The information processing system according to claim 1,
   wherein the processing circuitry is configured to determine the one or more printing companies having the printer that can execute the job, among the plurality of printing companies, based on characteristic information indicating characteristics of the plurality of printing companies.

6. The information processing system according to claim 1, wherein the processing circuitry is configured to notify the information terminal of information indicating a progress state of the job accepted, in response to a request from the information terminal.

7. The information processing system according to claim 1, wherein the processing circuitry is configured to accept the job from the information terminal via an application programming interface (API), and
wherein the processing circuitry is configured to transmit information of the one or more printing companies determined, to the information terminal as a response to the API.

8. The information processing system according to claim 1, further comprising a storage device,
wherein the processing circuitry is configured to:
receive, from the information terminal, an evaluation value for a printing company having been requested to execute a job in the past;
calculate a new evaluation value based on the evaluation value received and a current evaluation value of the printing company having been requested; and
store the new evaluation value in the storage device in association with the printing company having been requested.

9. The information processing system according to claim 8, wherein the processing circuitry is configured to include the evaluation value corresponding to the one or more printing companies in the determined information and transmit the information to the information terminal.

10. An information processing method, comprising:
receiving a job requesting print output of print data from an information terminal;
determining one or more printing companies having a printer that can execute a job, among a plurality of printing companies, based on a job schedule of the printer held by each one of the plurality of printing companies and a desired delivery date of the job; and
transmitting determined information to the information terminal.

11. A non-transitory computer-readable storage medium having instructions stored thereon, which when executed by one or more processors, cause the one or more processors to execute:
receiving a job requesting print output of print data from an information terminal;
determining one or more printing companies having a printer that can execute a job, among a plurality of printing companies, based on a job schedule of the printer held by each one of the plurality of printing companies and a desired delivery date of the job; and
transmitting determined information to the information terminal.

12. The information processing system according to claim 1, wherein:
the circuitry is configured to determine the one or more printing companies based on a state of the printer held by each one of the plurality of printing companies and a content of the job.

13. The information processing system according to claim 1, wherein:
the circuitry is configured to transmit the determined information which is information of the one or more printing companies determined, to the information terminal, to display the information on the information terminal.

14. The information processing system according to claim 1, wherein:
the circuitry is configured to transmit the determined information to the information terminal, in response to the circuitry determining the one or more printing companies.

15. The information processing system according to claim 1, wherein:
the determined information indicates that execution of the job has been determined.

16. The information processing system according to claim 1, wherein:
the determined information includes price.

17. The method according to claim 10, wherein:
the determining determines the one or more printing companies based on a state of the printer held by each one of the plurality of printing companies and a content of the job.

18. The method according to claim 10, wherein:
the transmitting transmits the determined information which is information of the one or more printing companies determined, to the information terminal, to display the information on the information terminal.

19. The method according to claim 10, wherein:
the transmitting transmits the determined information to the information terminal, in response to the determining the one or more printing companies.

20. The method according to claim 10, wherein:
the determined information indicates that execution of the job has been determined.

21. The method according to claim 10, wherein:
the determined information includes price.

22. The non-transitory computer-readable storage medium according to claim 11, wherein:
the determining determines the one or more printing companies based on a state of the printer held by each one of the plurality of printing companies and a content of the job.

23. The non-transitory computer-readable storage medium according to claim 11, wherein:
the transmitting transmits the determined information which is information of the one or more printing companies determined, to the information terminal, to display the information on the information terminal.

24. The non-transitory computer-readable storage medium according to claim 11, wherein:
the transmitting transmits the determined information to the information terminal, in response to the determining the one or more printing companies.

25. The non-transitory computer-readable storage medium according to claim 11, wherein:
the determined information indicates that execution of the job has been determined.

26. The non-transitory computer-readable storage medium according to claim 11, wherein:
the determined information includes price.

* * * * *